(12) United States Patent
Choi et al.

(10) Patent No.: US 12,287,729 B2
(45) Date of Patent: *Apr. 29, 2025

(54) NEURAL PROCESSING DEVICE AND METHOD FOR TRANSMITTING DATA THEREOF

(71) Applicant: Rebellions Inc., Seongnam-si (KR)

(72) Inventors: Sungpill Choi, Seongnam-si (KR); Jae-Sung Yoon, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/599,031

(22) Filed: Mar. 7, 2024

(65) Prior Publication Data

US 2024/0211389 A1   Jun. 27, 2024

Related U.S. Application Data

(63) Continuation of application No. 18/366,627, filed on Aug. 7, 2023, now Pat. No. 11,960,391.

(30) Foreign Application Priority Data

Sep. 19, 2022   (KR) .................. 10-2022-0118173

(51) Int. Cl.
*G06F 12/02* (2006.01)
*G06F 12/084* (2016.01)
*G06N 3/063* (2023.01)

(52) U.S. Cl.
CPC .......... *G06F 12/023* (2013.01); *G06F 12/084* (2013.01); *G06N 3/063* (2013.01); *G06F 2212/1016* (2013.01)

(58) Field of Classification Search
CPC ............... G06F 12/023; G06F 12/084; G06F 2212/1016
See application file for complete search history.

(56) References Cited

U.S. PATENT DOCUMENTS

2003/0200397 A1* 10/2003 McAllister .......... G06F 12/0828
                                                        711/138
2022/0284582 A1   9/2022 Yang et al.

FOREIGN PATENT DOCUMENTS

| JP | 2010-134628 A | 6/2010 |
|---|---|---|
| KR | 10-1994-0011050 B1 | 11/1994 |
| KR | 10-2258566 B1 | 6/2021 |

OTHER PUBLICATIONS

Office Action for KR 10-2022-0118173 by Korean Intellectual Property Office dated Sep. 19, 2024.

* cited by examiner

*Primary Examiner* — Jae U Yu
(74) *Attorney, Agent, or Firm* — BROADVIEW IP LAW, PC

(57) ABSTRACT

A processing device comprises processors, a first memory shared by the processors, and a cache comprising a second memory comprising a plurality of memory units, each of the plurality of memory units in the second memory being associated with a respective one of a plurality of request identifiers. The cache receives a memory read request including a request identifier and a memory address from at least one of the processors, identifies an allocated memory address identifier for the memory address, accesses the first memory to read data of the memory address, obtains one or more request identifiers which requested data of the memory address from the second memory based on the allocated memory address identifier, and transmitting the data of the memory address to one or more processors which requested data of the memory address based on the one or more request identifiers.

14 Claims, 31 Drawing Sheets

NEURAL PROCESSING DEVICE AND METHOD FOR TRANSMITTING DATA THEREOF

CROSS-REFERENCE TO RELATED APPLICATION

This application is a continuation application of U.S. patent application Ser. No. 18/366,627, filed on Aug. 7, 2023, which claims priority under 35 U.S.C § 119 to Korean Patent Application No. 10-2022-0118173 filed on Sep. 19, 2022, in the Korean Intellectual Property Office, the entire contents of which is hereby incorporated by reference.

TECHNICAL FIELD

The disclosure relates to a neural processing device and a method for transmitting data thereof. More particularly, the disclosure relates to a neural processing device including a neural processor cache that increases data transmission efficiency, and a method for transmitting data thereof.

BACKGROUND

For the last few years, artificial intelligence technology has been the core technology of the Fourth Industrial Revolution and the subject of discussion as the most promising technology worldwide. The biggest problem with artificial intelligence technology is computing performance. For artificial intelligence technology to realize a level of human learning ability, reasoning ability, perceptual ability, natural language implementation ability, etc., it is of the utmost importance to process a large amount of data quickly.

The central processing unit (CPU) or graphics processing unit (GPU) of off-the-shelf computers was used to implement deep-learning training and inference in early artificial intelligence, but these components had limitations in their ability to perform the tasks of deep-learning training and inference with high workloads. Thus, neural processing units (NPUs) that are structurally specialized for deep learning tasks have received a lot of attention.

In particular, such a neural processing unit has computation modules organized internally in a cluster form, and there is a need at the moment for a technique for each cluster to transmit data efficiently.

The description set forth in the background section should not be assumed to be prior art merely because it is set forth in the background section. The background section may describe aspects or embodiments of the disclosure.

SUMMARY

Aspects of the disclosure provide a neural processing device that increases data transmission efficiency.

Aspects of the disclosure provide a method for transmitting data of a neural processing device that increases data transmission efficiency.

According to some aspects of the disclosure, a processing device comprises processing circuitry comprising: a plurality of processors; a first memory shared by the plurality of processors; and a cache comprising a second memory comprising a plurality of memory units, each of the plurality of memory units in the second memory being associated with a respective one of a plurality of request identifiers, wherein the cache is configured to cause: receiving, from at least one of the plurality of processors, a memory read request including a request identifier and a memory address, identifying an allocated memory address identifier for the memory address, accessing the first memory to read data of the memory address, obtaining one or more request identifiers which requested data of the memory address from the second memory based on the allocated memory address identifier, and transmitting the data of the memory address to one or more processors which requested data of the memory address based on the one or more request identifiers.

According to some aspects of the disclosure, the cache further comprises: a third memory including a plurality of memory units, each of the plurality of memory units in the third memory being associated with a respective one of a plurality of memory address identifiers.

According to some aspects of the disclosure, obtaining the one or more request identifiers comprises: accessing a memory unit of the third memory based on the allocated memory address identifier to obtain a head request identifier and a tail request identifier, and accessing the second memory based on the head request identifier and the tail request identifier to obtain the one or more request identifiers.

According to some aspects of the disclosure, accessing the second memory based on the head request identifier and the tail request identifier comprises: reading a memory unit of the second memory based on the head request identifier to obtain a next request identifier and reading a memory unit of the second memory based on the next request identifier unless the next request identifier is the tail request identifier to obtain the one or more request identifiers which requested data of the memory address.

According to some aspects of the disclosure, the cache is further configured to cause: reading a memory unit of the third memory based on the allocated memory address identifier to obtain a tail request identifier, storing the request identifier of the memory read request to a memory unit of the second memory based on the tail request identifier, and writing the request identifier of the memory read request as the tail request identifier to a memory unit of the third memory based on the allocated memory address identifier.

According to some aspects of the disclosure, the cache further comprises: a fourth memory including a plurality of memory units, each of the plurality of memory units in the fourth memory being associated with a respective one of a plurality of memory address identifiers.

According to some aspects of the disclosure, the cache is further configured to cause: checking whether the memory address is stored in the fourth memory.

According to some aspects of the disclosure, identifying the allocated memory address identifier for the memory address comprises: when the memory address is not stored in the fourth memory, allocating the memory address an allocable memory address identifier among the plurality of memory address identifiers, and storing the memory address to a memory unit of the fourth memory based on the allocated memory address identifier.

According to some aspects of the disclosure, identifying the allocated memory address identifier for the memory address comprises: when the memory address is stored in the fourth memory, identifying a location of a memory unit storing the memory address in the fourth memory as the allocated memory address identifier.

According to some aspects of the disclosure, the memory address is an address indicating a memory unit in the first memory, an address representing a memory array including a plurality of memory units in the first memory, or an address representing a memory pattern including a plurality of memory units in the first memory.

A method of operating a processing device comprising a plurality of processors, a shared memory shared by the plurality of processors, and a cache, wherein the cache comprises a first table comprising a plurality of elements, each of the plurality of elements in the first table being associated with a respective one of a plurality of request identifiers, comprises: receiving, by the cache from at least one of the plurality of processors, a memory read request including a request identifier and a memory address, identifying, by the cache, an allocated memory address identifier for the memory address, accessing, by the cache, the shared memory to read data of the memory address, obtaining, by the cache from the first table, one or more request identifiers which requested data of the memory address based on the allocated memory address identifier, and transmitting, by the cache, the data of the memory address to one or more processors which requested data of the memory address based on the one or more request identifiers.

According to some aspects of the disclosure, the cache further comprises: a second table including a plurality of elements, each of the plurality of elements in the second table being associated with a respective one of a plurality of memory address identifiers.

According to some aspects of the disclosure, obtaining the one or more request identifiers comprises: accessing an element of the second table based on the allocated memory address identifier to obtain a head request identifier and a tail request identifier, and accessing the first table based on the head request identifier and the tail request identifier to obtain the one or more request identifiers.

According to some aspects of the disclosure, accessing the first table based on the head request identifier and the tail request identifier comprises: reading an element of the first table based on the head request identifier to obtain a next request identifier and reading an element of the first table based on the next request identifier unless the next request identifier is the tail request identifier to obtain the one or more request identifiers which requested data of the memory address.

According to some aspects of the disclosure, the method further comprises: reading, by the cache, an element of the second table based on the allocated memory address identifier to obtain a tail request identifier; storing, by the cache, the request identifier of the memory read request to an element of the first table based on the tail request identifier; and writing, by the cache, the request identifier of the memory read request as the tail request identifier to an element of the second table based on the allocated memory address identifier.

According to some aspects of the disclosure, the cache further comprises: a third table including a plurality of elements, each of the plurality of elements in the third table being associated with a respective one of a plurality of memory address identifiers.

According to some aspects of the disclosure, the method further comprises: checking, by the cache, whether the memory address is stored in the third table.

According to some aspects of the disclosure, identifying the allocated memory address identifier for the memory address comprises: when the memory address is not stored in the third table, allocating the memory address an allocable memory address identifier among the plurality of memory address identifiers, and storing the memory address to an element of the third table based on the allocated memory address identifier.

According to some aspects of the disclosure, identifying the allocated memory address identifier for the memory address comprises: when the memory address is stored in the third table, identifying a location of an element storing the memory address in the third table as the allocated memory address identifier.

According to some aspects of the disclosure, the memory address is an address indicating a memory unit in the shared memory, an address representing a memory array including a plurality of memory units in the shared memory, or an address representing a memory pattern including a plurality of memory units in the shared memory.

Aspects of the disclosure are not limited to those mentioned above and other objects and advantages of the disclosure that have not been mentioned can be understood by the following description and will be more clearly understood according to embodiments of the disclosure. In addition, it will be readily understood that the objects and advantages of the disclosure can be realized by the means and combinations thereof set forth in the claims.

The neural processing device and the method for transmitting data thereof of the disclosure can maximize the efficiency of data transmission by performing read operation with a single request when multiple neural cores request the same data in data transmission.

In addition, as the neural processor cache receives requests from the respective neural cores alternately, the efficiency of data transmission can be further improved.

In addition to the foregoing, the specific effects of the disclosure will be described together while elucidating the specific details for carrying out the embodiments below.

DETAILED DESCRIPTION OF THE PREFERRED EMBODIMENTS

Figure 1:
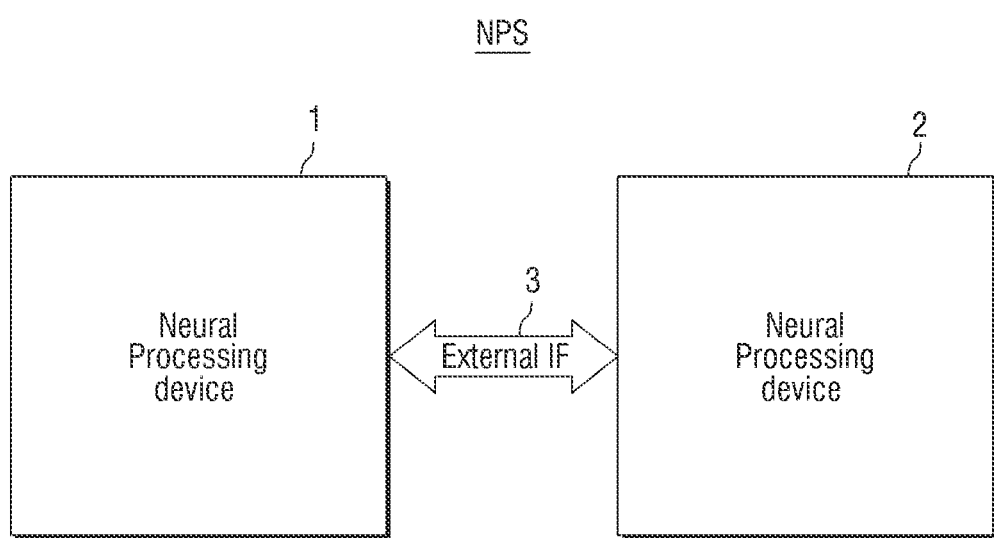
FIG. 1 is a block diagram for illustrating a neural processing system in accordance with some embodiments of the disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own embodiments in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular expressions include plural expressions unless the context explicitly indicates otherwise. In the application, terms such as "comprise," "have," "include", "contain," etc. should be understood as not precluding the possibility of existence or addition of features, numbers, steps, operations, components, parts, or combinations thereof described herein. Terms such as a "circuit" or "circuitry", refers to a circuit in hardware but may also refer to a circuit in software.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless otherwise defined, all terms used herein, including technical or scientific terms, have the same meaning as commonly understood by those of ordinary skill in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the disclosure.

In addition, each configuration, procedure, process, method, or the like included in each embodiment of the disclosure may be shared to the extent that they are not technically contradictory to each other.

Hereinafter, a neural processing device in accordance with some embodiments of the disclosure will be described with reference to FIGS. 1 to 26.

FIG. 1 is a block diagram illustrating a neural processing system in accordance with some embodiments of the disclosure.

Referring to FIG. 1, a neural processing system NPS in accordance with some embodiments may include a first neural processing device 1, a second neural processing device 2, and an external interface 3.

The first neural processing device 1 may be a device that performs calculations using an artificial neural network. The first neural processing device 1 may be, for example, a device specialized in performing tasks of deep learning calculations. However, the embodiment is not limited thereto.

The second neural processing device 2 may be a device having the same or similar configuration as the first neural processing device 1. The first neural processing device 1 and the second neural processing device 2 may be connected to each other via the external interface 3 and share data and control signals.

Although FIG. 1 shows two neural processing devices, the neural processing system NPS in accordance with some embodiments is not limited thereto. In some embodiments, in a neural processing system NPS, three or more neural processing devices may be connected to each other via the external interface 3. Also, conversely, a neural processing system NPS in accordance with some embodiments may include only one neural processing device.

In this case, the first neural processing device 1 and the second neural processing device 2 may each be a processing device other than the neural processing device. In some embodiments, the first neural processing device 1 and the second neural processing device 2 may each be a graphics processing unit (GPU), a central processing unit (CPU), or other types of processing units as well. In the following, the first neural processing device 1 and the second neural processing device 2 will be described as neural processing devices for convenience.

Figure 2:
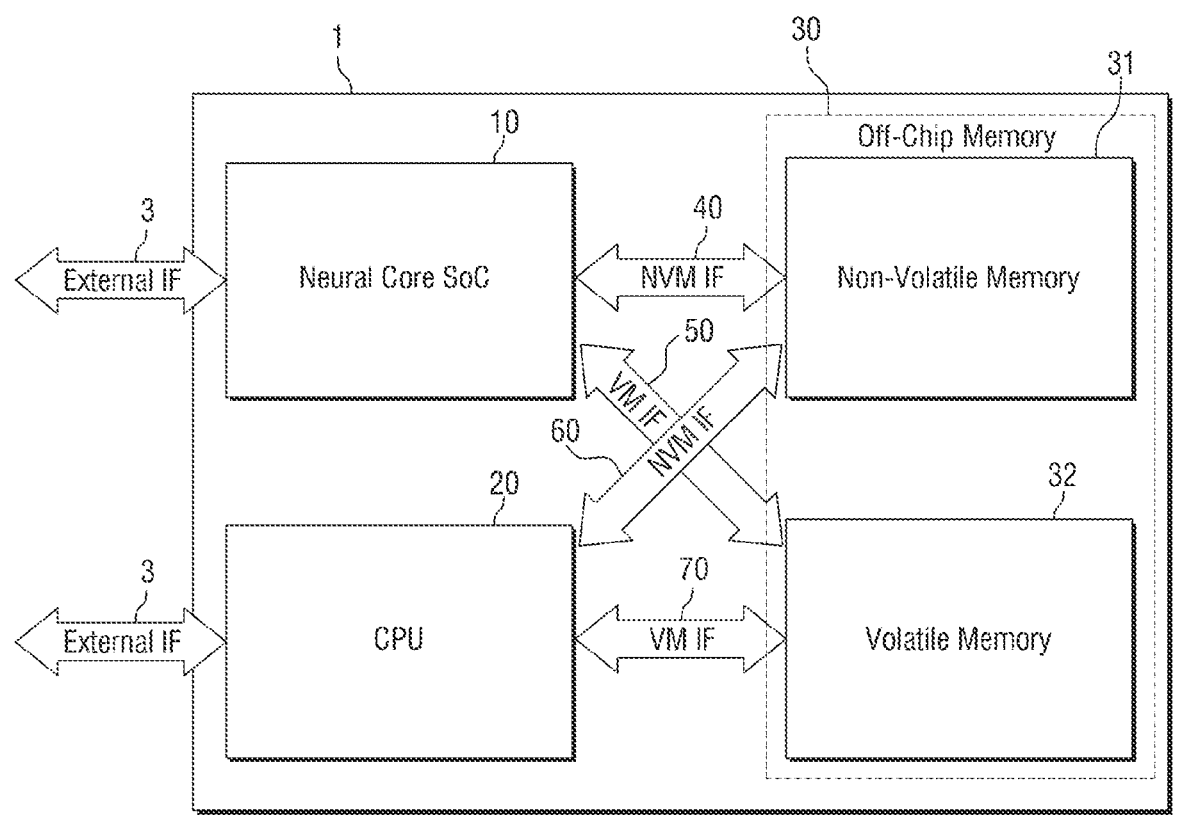
FIG. 2 is a block diagram for illustrating the neural processing device of FIG. 1.

FIG. 2 is a block diagram for illustrating the neural processing device of FIG. 1.

Referring to FIG. 2, a first neural processing device 1 may include a neural core SoC 10, a CPU 20, an off-chip memory 30, a first non-volatile memory interface 40, a first volatile memory interface 50, a second non-volatile memory interface 60, and a second volatile memory interface 70.

The neural core SoC 10 may be a system on a chip device. The neural core SoC 10 can be an artificial intelligence calculation device and may be an accelerator. The neural core SoC 10 may be, for example, any one of a graphics processing unit (GPU), a field-programmable gate array (FPGA), or an application-specific integrated circuit (ASIC). However, the embodiment is not limited thereto.

The neural core SoC 10 may exchange data with other external calculation devices via the external interface 3. Further, the neural core SoC 10 may be connected to the non-volatile memory 31 and the volatile memory 32 via the first non-volatile memory interface 40 and the first volatile memory interface 50, respectively.

The CPU 20 may be a control device that controls the system of the first neural processing device 1 and executes program calculations. The CPU 20 is a general-purpose calculation device and may have low efficiency in performing simple parallel calculations that are frequently used in deep learning. Accordingly, there can be high efficiency by performing calculations in deep learning inference and training tasks by the neural core SoC 10.

The CPU 20 may exchange data with other external calculation units via the external interface 3. Further, the CPU 20 may be connected to the non-volatile memory 31 and the volatile memory 32 via the second non-volatile memory interface 60 and the second volatile memory interface 70, respectively.

The off-chip memory 30 may be a memory disposed outside the chip of the neural core SoC 10. The off-chip memory 30 may include a non-volatile memory 31 and a volatile memory 32.

The non-volatile memory 31 may be a memory that continuously retains stored information even if electric power is not supplied. The non-volatile memory 31 may include, for example, at least one of Read-Only Memory (ROM), Programmable Read-Only Memory (PROM), Erasable Alterable ROM (EAROM), Erasable Programmable Read-Only Memory (EPROM), Electrically Erasable Programmable Read-Only Memory (EEPROM) (e.g., NAND Flash memory, NOR Flash memory), Ultra-Violet Erasable Programmable Read-Only Memory (UVEPROM), Ferroelectric Random-Access Memory (FeRAM), Magnetoresistive Random-Access Memory (MRAM), Phase-change Random-Access Memory (PRAM), silicon-oxide-nitride-oxide-silicon (SONOS), Resistive Random-Access Memory (RRAM), Nanotube Random-Access Memory (NRAM), magnetic computer storage devices (e.g., hard disks, diskette drives, magnetic tapes), optical disc drives, or 3D XPoint memory. However, the embodiment is not limited thereto.

The volatile memory 32 may be a memory that continuously requires electric power to retain stored information, unlike the non-volatile memory 31. The volatile memory 32 may include, for example, at least one of Dynamic Random-Access Memory (DRAM), Static Random-Access Memory (SRAM), Synchronous Dynamic Random-Access Memory (SDRAM), or Double Data Rate SDRAM (DDR SDRAM). However, the embodiment is not limited thereto.

Each of the first non-volatile memory interface 40 and the second non-volatile memory interface 60 may include, for example, at least one of Parallel Advanced Technology Attachment (PATA), Small Computer System Interface (SCSI), Serial Attached SCSI (SAS), Serial Advanced Technology Attachment (SATA), or PCI Express (PCIe). However, the embodiment is not limited thereto.

Each of the first volatile memory interface 50 and the second volatile memory interface 70 may be, for example, at least one of SDR (Single Data Rate), DDR (Double Data Rate), QDR (Quad Data Rate), or XDR (eXtreme Data Rate, Octal Data Rate). However, the embodiment is not limited thereto.

Figure 3:
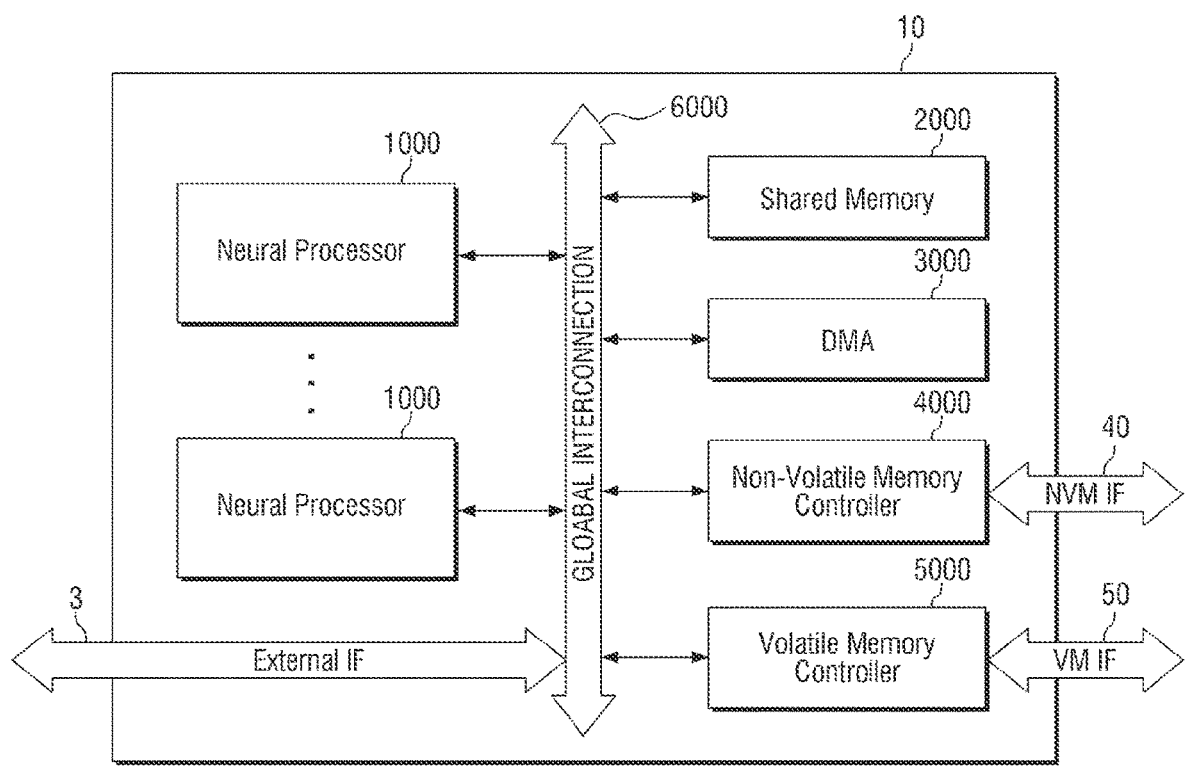
FIG. 3 is a block diagram for illustrating the neural core SoC of FIG. 2.

FIG. 3 is a block diagram for illustrating the neural core SoC of FIG. 2.

Referring to FIGS. 2 and 3, the neural core SoC 10 may include at least one neural processor 1000, a shared memory 2000, direct memory access (DMA) 3000, a non-volatile memory controller 4000, a volatile memory controller 5000, and a global interconnection 6000.

The neural processor 1000 may be a calculation device that directly performs calculation tasks. If there exist neural processors 1000 in plurality, calculation tasks may be assigned to respective neural processors 1000. The respective neural processors 1000 may be connected to each other via the global interconnection 6000.

The shared memory 2000 may be a memory shared by multiple neural processors 1000. The shared memory 2000 may store data of each neural processor 1000. In addition, the shared memory 2000 may receive data from the off-chip memory 30, store the data temporarily, and transfer the data to each neural processor 1000. The shared memory 2000 may also receive data from the neural processor 1000, store the data temporarily, and transfer the data to the off-chip memory 30 of FIG. 2.

The shared memory 2000 may be required to be a relatively high-speed memory. Accordingly, the shared memory 2000 may include, for example, an SRAM. However, the embodiment is not limited thereto. In some embodiments, the shared memory 2000 may include a DRAM as well.

The shared memory 2000 may be a memory corresponding to the SoC level, i.e., level 2 (L2). Accordingly, the shared memory 2000 may also be defined as an L2 shared memory.

The DMA 3000 may directly control the movement of data without the need for the neural processor 1000 to control the input/output of data. Accordingly, the DMA 3000 may control the data movement between memories, thereby minimizing the number of interrupts of the neural processor 1000.

The DMA 3000 may control the data movement between the shared memory 2000 and the off-chip memory 30. Via the authority of the DMA 3000, the non-volatile memory controller 4000 and the volatile memory controller 5000 may perform the movement of data.

The non-volatile memory controller 4000 may control the task of reading from or writing onto the non-volatile memory 31. The non-volatile memory controller 4000 may control the non-volatile memory 31 via the first non-volatile memory interface 40. In this case, the non-volatile memory controller 4000 may be referred to as a non-volatile memory controller circuit, but for the sake of convenience, the terms are unified as a non-volatile memory controller. In addition, the non-volatile memory controller 4000 may be implemented as a circuit or circuitry.

The volatile memory controller 5000 may control the task of reading from or writing onto the volatile memory 32. Further, the volatile memory controller 5000 may perform a refresh task of the volatile memory 32. The volatile memory controller 5000 may control the volatile memory 32 via the first volatile memory interface 50. Likewise, the volatile memory controller 5000 may be referred to as a volatile memory controller circuit, but for the sake of convenience, the terms are unified as a volatile memory controller. In addition, the volatile memory controller 5000 may be implemented as a circuit or circuitry.

The global interconnection 6000 may connect the at least one neural processor 1000, the shared memory 2000, the DMA 3000, the non-volatile memory controller 4000, and the volatile memory controller 5000 to one another. In addition, the external interface 3 may also be connected to the global interconnection 6000. The global interconnection 6000 may be a path through which data travels between the at least one neural processor 1000, the shared memory 2000, the DMA 3000, the non-volatile memory controller 4000, the volatile memory controller 5000, and the external interface 3.

The global interconnection 6000 may transmit not only data but also control signals and may transmit a signal for synchronization. In some embodiments, in the neural processing device, each neural processor 1000 may directly transmit and receive a synchronization signal, instead of a separate control processor managing the synchronization signal. Accordingly, it is possible to preclude the latency of the synchronization signal generated by the control processor.

In some embodiments, if there exist neural processors 1000 in plurality, there may be dependencies of individual tasks in which the task of one neural processor 1000 needs to be finished before the next neural processor 1000 can start a new task. The end and start of these individual tasks can be checked and/or coordinated via a synchronization signal, and in conventional techniques, a control processor performed the reception of such a synchronization signal and an instruction to start a new task.

However, as the number of neural processors 1000 increases and task dependencies are designed more complicatedly, the number of requests and instructions for this synchronization task can increase exponentially. Therefore, the latency resulting from each request and instruction can greatly reduce the efficiency of tasks.

Accordingly, in the neural processing device in accordance with some embodiments, each neural processor 1000, instead of the control processor, may directly transmit a synchronization signal to another neural processor 1000 according to the dependency of a task. In this case, several neural processors 1000 can perform the synchronization tasks in parallel as compared with the method managed by the control processor, thereby minimizing the latency due to synchronization.

In addition, the control processor needs to perform the task scheduling of the neural processors 1000 according to a task dependency, and the overhead of such scheduling may increase significantly as the number of neural processors 1000 increases. Accordingly, in the neural processing device, in accordance with some embodiments, the scheduling task is also performed by the individual neural processors 1000, and thus, the performance of the neural processing device can be improved without resulting in an additional scheduling burden.

Figure 4:
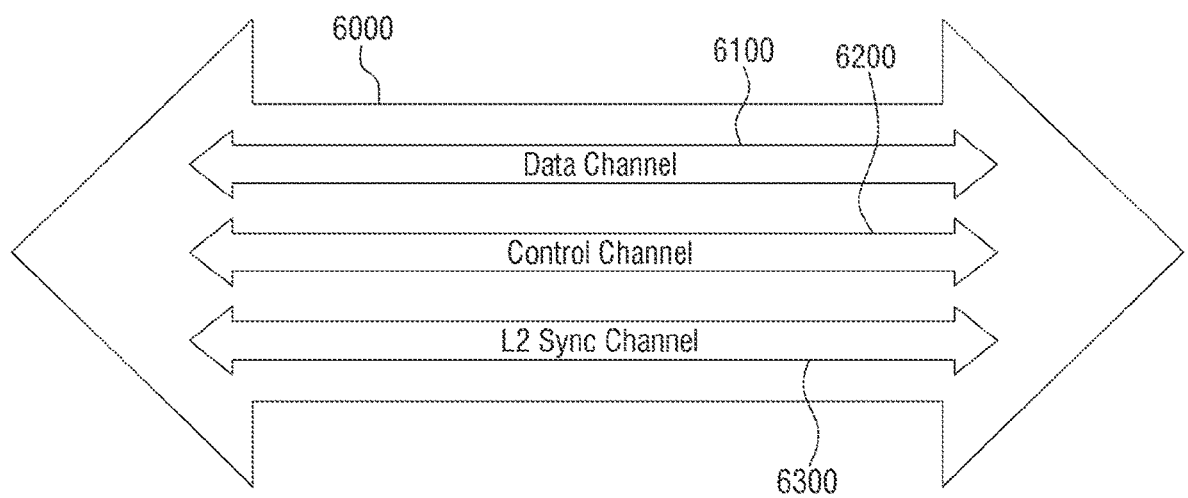
FIG. 4 is a structural diagram for illustrating the global interconnection of FIG. 3.

FIG. 4 is a structural diagram for illustrating the global interconnection of FIG. 3.

Referring to FIG. 4, the global interconnection 6000 may include a data channel 6100, a control channel 6200, and an L2 sync channel 6300.

The data channel 6100 may be a dedicated channel for transmitting data. Through the data channel 6100, the at least one neural processor 1000, the shared memory 2000, the DMA 3000, the non-volatile memory controller 4000, the volatile memory controller 5000, and the external interface 3 may exchange data with one another.

The control channel 6200 may be a dedicated channel for transmitting control signals. Through the control channel 6200, the at least one neural processor 1000, the shared memory 2000, the DMA 3000, the non-volatile memory controller 4000, the volatile memory controller 5000, and the external interface 3 may exchange control signals with one another.

The L2 sync channel 6300 may be a dedicated channel for transmitting synchronization signals. Through the L2 sync channel 6300, the at least one neural processor 1000, the shared memory 2000, the DMA 3000, the non-volatile memory controller 4000, the volatile memory controller 5000, and the external interface 3 may exchange synchronization signals with one another.

The L2 sync channel 6300 may be set as a dedicated channel inside the global interconnection 6000, and thus, may not overlap with other channels and transmit synchronization signals quickly. Accordingly, the neural processing device in accordance with some embodiments does not require new wiring work and may smoothly perform the synchronization task by using the global interconnection 6000.

Figure 5:
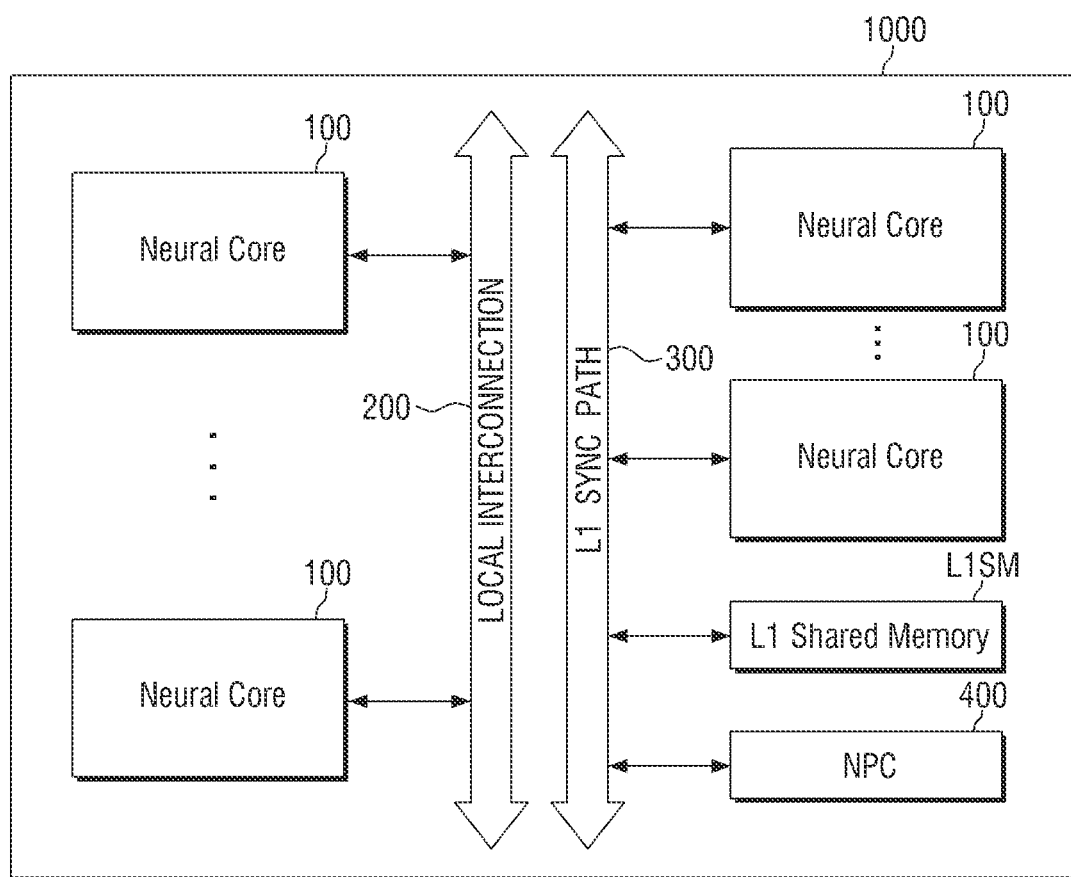
FIG. 5 is a block diagram for illustrating the neural processor of FIG. 3.

FIG. 5 is a block diagram for illustrating the neural processor of FIG. 3.

Referring to FIGS. 3 to 5, the neural processor 1000 may include at least one neural core 100, an L1 shared memory L1SM, a neural processor cache (NPC) 400, a local interconnection 200, and an L1 sync path 300.

The at least one neural core 100 may share and perform the tasks of the neural processor 1000. The number of neural cores 100 may be, for example, eight. However, the embodiment is not limited thereto. FIGS. 3 and 5 illustrate that a plurality of neural cores are included in the neural processor 1000, but the embodiment is not limited thereto. In some embodiments, the neural processor 1000 may be configured with only one neural core.

The L1 shared memory L1SM may be a memory shared by the neural cores 100 in the neural processor 1000. The L1 shared memory L1SM may store data of each neural core 100. In addition, the L1 shared memory L1SM may receive data from the shared memory 2000 of FIG. 3, store them temporarily, and transfer them to each neural core 100. On the contrary, the L1 shared memory L1SM may also receive data from the neural core 100, store them temporarily, and transfer them to the shared memory 2000 of FIG. 3.

The L1 shared memory L1SM may be a memory corresponding to the neural processor level, i.e., level 1 (L1). The L2 shared memory, i.e., the shared memory 2000 may be shared by the neural processors 1000, and the L1 shared memory L1SM may be shared by the neural cores 100.

The neural processor cache 400 may be a memory located inside the neural processor 1000. The neural processor cache 400 may be a separate memory from the L1 shared memory L1SM or may be a single memory combined with the L1 shared memory L1SM. The neural processor cache 400 may be shared by the neural cores 100 in the same way as the L1 shared memory L1SM.

The neural processor cache 400 may receive a read request for data from at least one of the neural cores 100 and transfer the read request to an external memory (the off-chip memory 30 in FIG. 2 or the shared memory 2000 in FIG. 3). The neural processor cache 400 may receive and temporarily store read data corresponding to the read request, and transfer the read data to the neural core 100 that made the request. In this case, the neural processor cache 400 can maximize the efficiency of data transmission by receiving and distributing the read data at once when the same read data is requested from multiple neural cores 100.

The local interconnection 200 may connect the at least one neural core 100 and the L1 shared memory L1SM to each other. The local interconnection 200 may be a path through which data travels between the at least one neural core 100 and the L1 shared memory L1SM. The local interconnection 200 may be connected and transmit data to the global interconnection 6000 of FIG. 3.

The L1 sync path 300 may connect the at least one neural core 100 and the L1 shared memory L1SM to each other. The L1 sync path 300 may be a path through which synchronization signals of the at least one neural core 100 and the L1 shared memory L1SM travel.

The L1 sync path 300 may be formed physically separately from the local interconnection 200. In the case of the local interconnection 200, sufficient channels may not be formed therein, unlike the global interconnection 6000. In such a case, the L1 sync path 300 may be formed separately so that the synchronization signal can be transmitted quickly and without any delay. The L1 sync path 300 may be used for synchronization performed at a level one step lower than that of the L2 sync channel 6300 of the global interconnection 6000.

Figure 6:
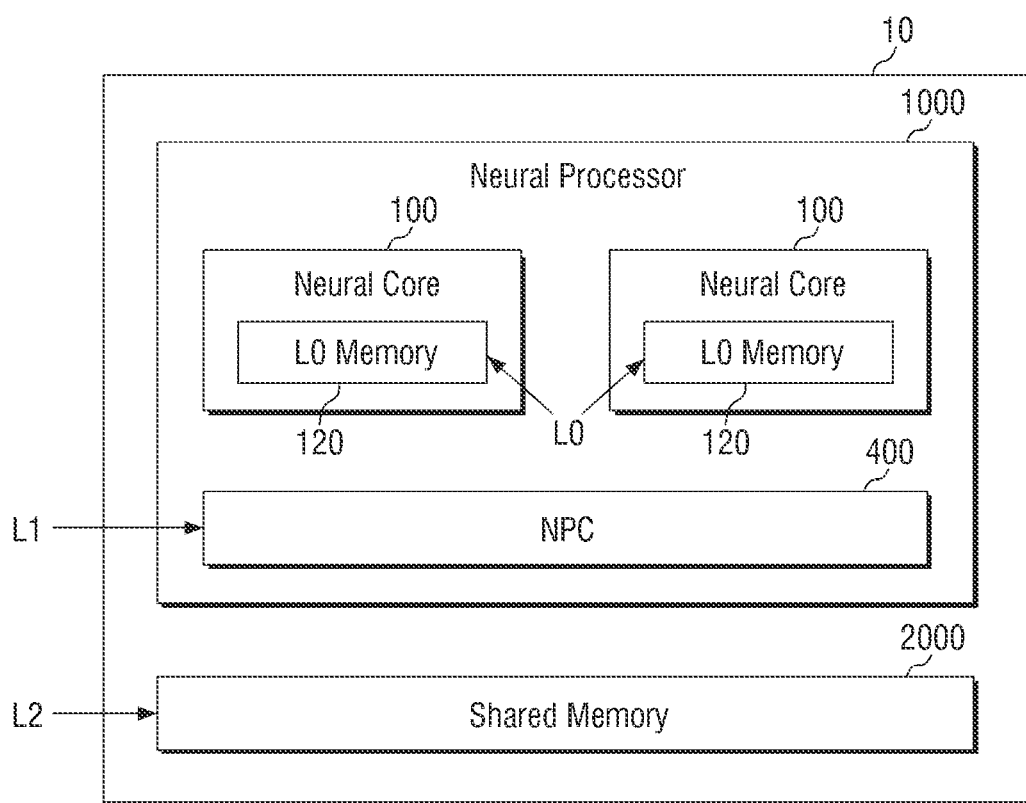
FIG. 6 is a block diagram for illustrating memories according to levels of the neural processing device of FIG. 1.

FIG. 6 is a block diagram for illustrating memories according to levels of the neural processing device of FIG. 1.

Referring to FIGS. 3 and 6, the neural processing device 1 may include a plurality of neural processors 1000 and a shared memory 2000 shared by each neural processor 1000. In some embodiments, the shared memory 2000 may be a memory belonging to the highest level, i.e., the second level L2.

Each neural processor 1000 may include a plurality of neural cores 100 therein, and may include a neural processor cache 400 shared by each neural core 100. In some embodiments, the neural processor cache 400 may be a memory belonging to a level lower than the second level L2, i.e., the first level L1. The L1 shared memory L1SM of FIG. 5 may also be a memory separately belonging to the first level L1.

Each neural core 100 may include an L0 memory 120 therein. In some embodiments, the L0 memory 120 may be a memory belonging to the lowest ground level, i.e., the 0th level L0. As described above, in the embodiment, memories exist according to the respective levels, and a computation structure according thereto is formed in a hierarchical structure, so that modular operations can be performed appropriately.

Figure 7:
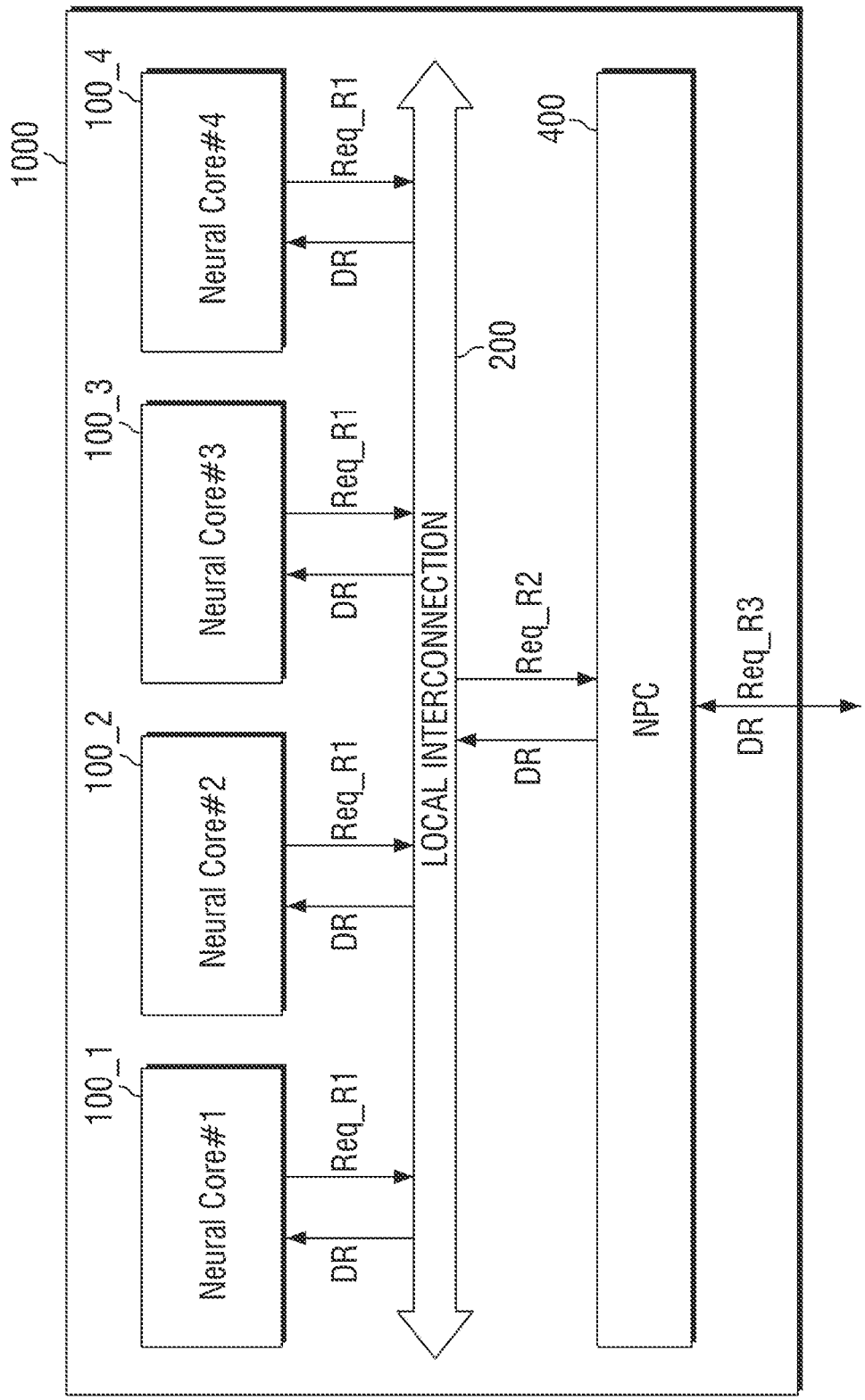
FIG. 7 is a block diagram for illustrating an operation of the neural processor cache of FIG. 5.

FIG. 7 is a block diagram for illustrating an operation of the neural processor cache of FIG. 5.

Referring to FIGS. 5 and 7, the neural core 100 of FIG. 5 may correspond to a first neural core 100_1, a second neural core 100_2, a third neural core 100_3, and a fourth neural core 100_4, respectively. Although four neural cores are shown in FIG. 7, the embodiment is not limited thereto.

In some embodiments, the number of neural cores in the neural processor 1000 may vary as desired.

Each neural core may transmit a first read request Req_R1 to the local interconnection 200. In some embodiments, the first to fourth neural cores 100_1 to 100_4 may include different unique request identifiers (request IDs) in the first read request Req_R1. The request ID may serve as an identifier of each read request and/or an identifier of the first to fourth neural cores 100_1 to 100_4 that are the sources of each request, i.e., the senders. In some embodiments, it is possible to check from which neural core the first read request Req_R1 is requested through the request ID.

The first read request Req_R1 may include a memory address. In some embodiments, the memory address may be referred to as a reception address. The memory address may be referred to as an address indicating a memory unit storing data requested by the first read request Req_R1, an address representing a memory array including a plurality of memory units storing data requested by the first read request Req_R1, or an address representing a memory pattern including a plurality of memory units storing data requested by the first read request Req_R1. In some embodiments, the local interconnection 200 may receive a plurality of first read requests Req_R1 including the same memory address. In some embodiments, the first read requests Req_R1 may all include the same memory address. In some embodiments, the read requests having the same memory address out of multiple read requests issued by the first to fourth neural cores 100_1 to 100_4 may be defined as the first read request Req_R1.

The local interconnection 200 may receive the first read request Req_R1 and generate a second read request Req_R2. The second read request Req_R2 may be substantially the same as the first read request Req_R1. Alternatively, the second read request Req_R2 may be a request obtained by adding some priority information to the first read request Req_R1. In some embodiments, a plurality of first read requests Req_R1 may be defined as a plurality of second read requests Req_R2 and transmitted in sequence to the neural processor cache 400. In some embodiments, the local interconnection 200 may transmit the second read requests Req_R2 to the neural processor cache 400, and the second read requests Req_R2 may be transmitted in sequence even though they are plural.

The neural processor cache 400 may receive the plurality of the second read requests Req_R2 in sequence and generate a third read request Req_R3. In some embodiments, the third read request Req_R3 may be a request in a form in which the second read requests Req_R2 are merged with each other. The neural processor cache 400 may transmit the third read request Req_R3 to the global interconnection 6000 of FIG. 3. In response to the third read request Req_R3, the neural processor cache 400 may receive the read data DR from the off-chip memory 30.

The neural processor cache 400 may transmit the read data DR to the first to fourth neural cores 100_1 to 100_4 by way of the local interconnection 200. Accordingly, the first to fourth neural cores 100_1 to 100_4 may acquire the read data DR.

The neural processing device of the embodiment may have a lot of cases in which the same data is repeatedly requested by multiple neural cores 100 while performing deep learning tasks. However, if data is transmitted all in the same procedure for each request, transmission efficiency for the same data may be very low. Therefore, the neural processor cache 400 of the embodiment can detect a plurality of read requests for the same memory address, i.e., the same data, and issue and transfer the read requests all at once. Accordingly, the speed and efficiency of the entire device can be increased by blocking the inefficiency of transferring a plurality of read requests for the data of the same address multiple times.

Figure 8:
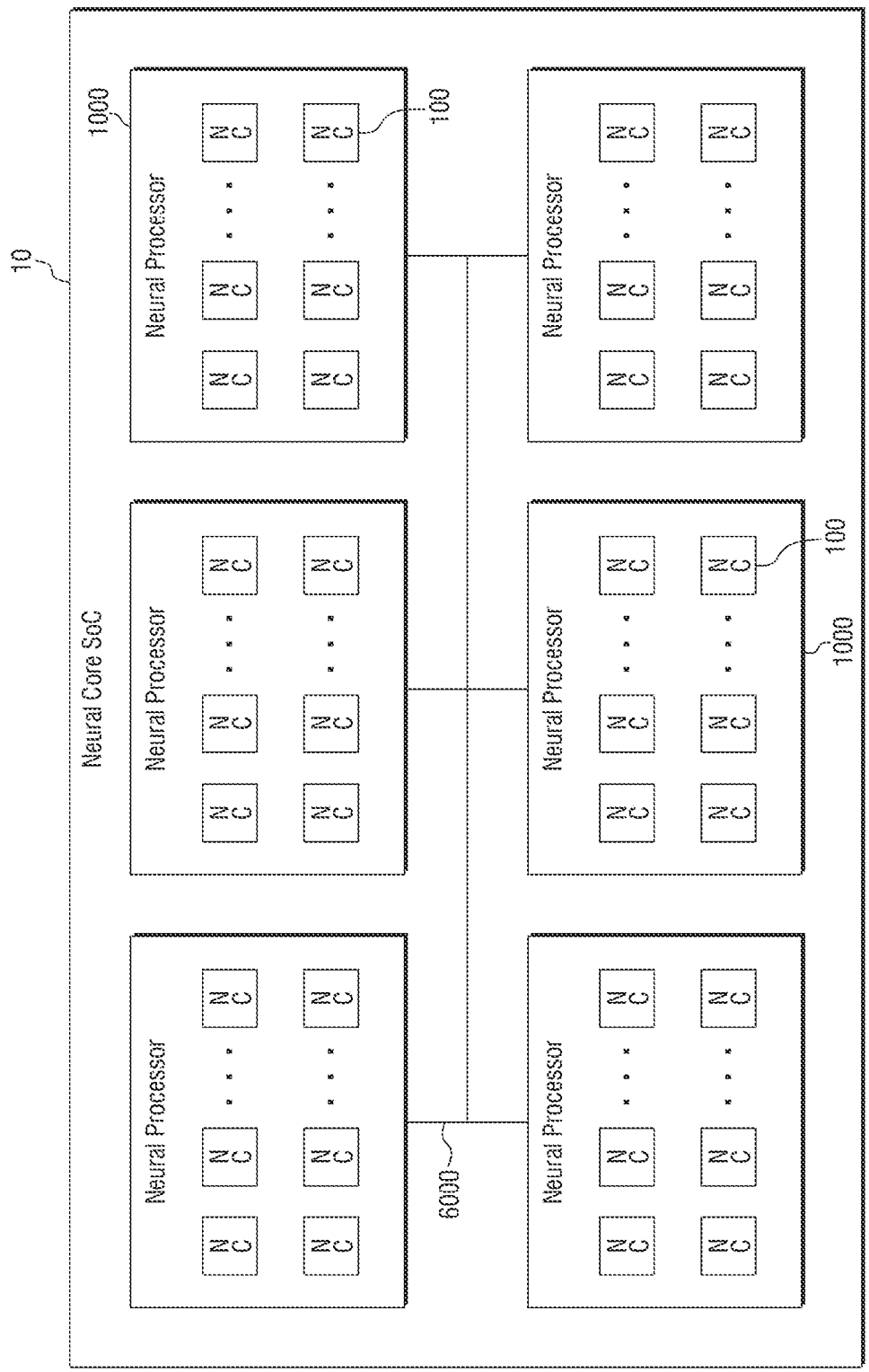
FIG. 8 is a diagram for illustrating a hierarchical structure of a neural processing device in accordance with some embodiments of the disclosure.

FIG. 8 is a diagram for illustrating a hierarchical structure of a neural processing device in accordance with some embodiments of the disclosure.

Referring to FIG. 8, the neural core SoC 10 may include at least one neural processor 1000. Each of at least one neural processor 1000 may transmit data to each other via the global interconnection 6000.

Each of at least one neural processors 1000 may include at least one neural core 100. The neural core 100 may be a processing unit optimized for deep learning calculation tasks. The neural core 100 may be a processing unit corresponding to one operation of a deep learning calculation task. In some embodiments, a deep learning calculation task can be represented by a sequential or parallel combination of multiple operations. In some embodiments, each of the neural cores 100 may be a processing unit capable of processing one operation and may be a minimum calculation unit that can be considered for scheduling from the viewpoint of a compiler.

The neural processing device in accordance with the embodiment may configure the scales of the minimum calculation unit considered from the viewpoint of compiler scheduling and the hardware processing unit to be the same, so that fast and efficient scheduling and calculation tasks can be performed.

In some embodiments, if the processing units into which hardware can be divided are too large compared to calculation tasks, inefficiency of the calculation tasks may occur in driving the processing units. Conversely, it is not appropriate to schedule a processing unit that is a unit smaller than an operation, which is the minimum scheduling unit of the compiler, every time since a scheduling inefficiency may occur and hardware design costs may increase.

Therefore, by adjusting the scales of the scheduling unit of the compiler and the hardware processing unit to be similar in the embodiment, it is possible to simultaneously satisfy the fast scheduling of calculation tasks and the efficient execution of the calculation tasks without wasting hardware resources.

Figure 9:
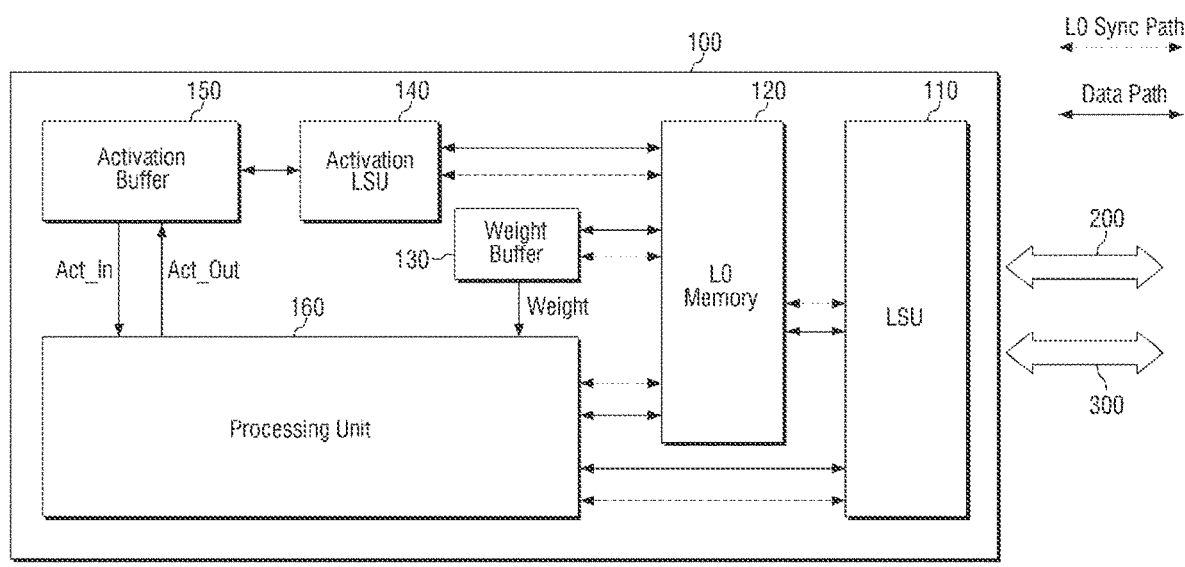
FIG. 9 is a block diagram for illustrating the neural core of FIG. 5 in detail.

FIG. 9 is a block diagram for illustrating the neural core of FIG. 5 in detail.

Referring to FIG. 9, the neural core 100 may include a load/store unit (LSU) 110, an L0 memory 120, a weight buffer 130, an activation LSU 140, an activation buffer 150, and a processing unit 160.

The LSU 110 may receive at least one of data, a control signal, or a synchronization signal from the outside via the local interconnection 200 and the L1 sync path 300. The LSU 110 may transmit at least one of the data, the control signal, or the synchronization signal received to the L0 memory 120. Similarly, the LSU 110 may transfer at least one of the data, the control signal, or the synchronization signal to the outside via the local interconnection 200 and the L1 sync path 300. In this case, the LSU 110 may be referred to as an LSU circuit, but for the sake of convenience, the terms are unified as an LSU. In addition, the LSU 110 may be implemented as a circuit or circuitry.

Figure 10:
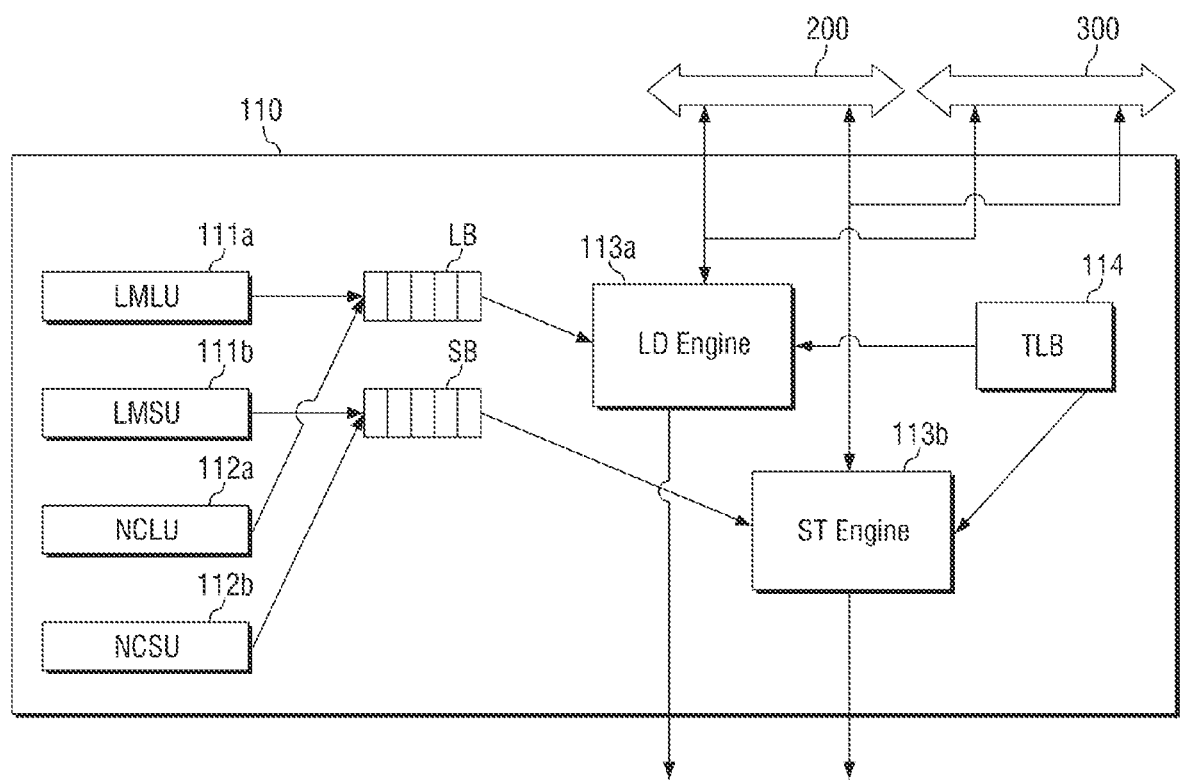
FIG. 10 is a block diagram for illustrating the LSU of FIG. 9 in detail.

FIG. 10 is a block diagram for illustrating the LSU of FIG. 9 in detail.

Referring to FIG. 10, the LSU 110 may include a local memory load unit (LMLU) 111a, a local memory store unit (LMSU) 111b, a neural core load unit (NCLU) 112a, a neural core store unit (NCSU) 112b, a load buffer LB, a store buffer SB, a load (LD) engine 113a, a store (ST) engine 113b, and a translation lookaside buffer (TLB) 114.

The local memory load unit 111a, the local memory store unit 111b, the neural core load unit 112a, the neural core store unit 112b, the load engine 113a, and the store engine 113b may be referred to respectively as a local memory load circuit, a local memory store circuit, a neural core load circuit, a neural core store circuit, a load engine circuit, and a store engine circuit. However, for the sake of convenience, the terms are respectively unified as a local memory load unit, a local memory store unit, a neural core load unit, a neural core store unit, a load engine, and a store engine. In addition, each of the local memory load unit 111a, the local memory store unit 111b, the neural core load unit 112a, the neural core store unit 112b, the load engine 113a, and the store engine 113b may be implemented as a circuit or circuitry.

The local memory load unit 111a may fetch a load instruction for the L0 memory 120 and issue the load instruction. When the local memory load unit 111a provides the issued load instruction to the load buffer LB, the load buffer LB may sequentially transmit memory access requests to the load engine 113a according to the inputted order.

Further, the local memory store unit 111b may fetch a store instruction for the L0 memory 120 and issue the store instruction. When the local memory store unit 111b provides the issued store instruction to the store buffer SB, the store buffer SB may sequentially transmit memory access requests to the store engine 113b according to the inputted order.

The neural core load unit 112a may fetch a load instruction for the neural core 100 and issue the load instruction. When the neural core load unit 112a provides the issued load instruction to the load buffer LB, the load buffer LB may sequentially transmit memory access requests to the load engine 113a according to the inputted order.

In addition, the neural core store unit 112b may fetch a store instruction for the neural core 100 and issue the store instruction. When the neural core store unit 112b provides the issued store instruction to the store buffer SB, the store buffer SB may sequentially transmit memory access requests to the store engine 113b according to the inputted order.

The load engine 113a may receive the memory access request and retrieve data via the local interconnection 200. In some embodiments, the load engine 113a may quickly find the data by using a translation table of a logical address and a physical address that has been used recently in the translation lookaside buffer 114. If the logical address of the load engine 113a is not in the translation lookaside buffer 114, the address translation information may be found in another memory.

The store engine 113b may receive the memory access request and retrieve data via the local interconnection 200. In some embodiments, the store engine 113b may quickly find the data by using a translation table of a logical address and a physical address that has been used recently in the translation lookaside buffer 114. If the logical address of the store engine 113b is not in the translation lookaside buffer 114, the address translation information may be found in another memory.

The load engine 113a and the store engine 113b may send synchronization signals to the L1 sync path 300. In some embodiments, the synchronization signal may indicate that the task has been completed.

Referring to FIG. 9 again, the L0 memory 120 is a memory located inside the neural core 100, and may receive all input data required for the tasks by the neural core 100 from the outside and store them temporarily. In addition, the L0 memory 120 may temporarily store the output data calculated by the neural core 100 for transmission to the outside. The L0 memory 120 may serve as a cache memory of the neural core 100.

The L0 memory 120 may transmit an input activation Act_In to the activation buffer 150 and receive an output activation Act_Out via the activation LSU 140. The L0 memory 120 may directly transmit and receive data to and from the processing unit 160, in addition to the activation LSU 140. In some embodiments, the L0 memory 120 may exchange data with each of a processing element (PE) array 163 and a vector unit 164. The L0 memory 120 may be a memory corresponding to the level of the neural core. In this case, the L0 memory 120 may be a private memory of the neural core that is not shared.

The L0 memory 120 may be a memory corresponding to the level of the neural core. In this case, the L0 memory 120 may be a private memory of the neural core.

The L0 memory 120 may transmit data such as activations or weights via a data path. The L0 memory 120 may exchange synchronization signals via an L0 sync path, which is a separate dedicated path. The L0 memory 120 may exchange synchronization signals with, for example, the LSU 110, the weight buffer 130, the activation LSU 140, and the processing unit 160 via the L0 sync path.

The weight buffer 130 may receive a weight from the L0 memory 120. The weight buffer 130 may transfer the weight to the processing unit 160. The weight buffer 130 may temporarily store the weight before transferring it.

The input activation Act_In and the output activation Act_Out may be referred to as input values and output values of the layers of a neural network. In this case, if there are a plurality of layers in the neural network, the output value of the previous layer becomes the input value of the next layer, and thus, the output activation Act_Out of the previous layer may be utilized as the input activation Act_In of the next layer.

The weight may be referred to as a parameter that is multiplied by the input activation Act_In inputted in each layer. The weight is adjusted and confirmed in the deep learning training phase, and may be used to derive the output activation Act_Out via a fixed value in the inference phase.

The activation LSU 140 may transfer the input activation Act_In from the L0 memory 120 to the activation buffer 150, and the output activation Act_Out from the activation buffer 150 to the on-chip buffer. In some embodiments, the activation LSU 140 may perform both a load task and a store task of the activation.

The activation buffer 150 may provide the input activation Act_In to the processing unit 160 and receive the output activation Act_Out from the processing unit 160. The activation buffer 150 may temporarily store the input activation Act_In and the output activation Act_Out.

The activation buffer 150 may quickly provide the activation to the processing unit 160, in particular, the PE array 163, which has a large quantity of calculations, and may quickly receive the activation, thereby increasing the calculation speed of the neural core 100.

The processing unit 160 may be a module that performs calculations. The processing unit 160 may perform not only one-dimensional calculations but also two-dimensional matrix calculations, i.e., convolution operations. The processing unit 160 may receive an input activation Actin, multiply it by a weight, and then add it to generate an output activation Act_Out.

Figure 11:
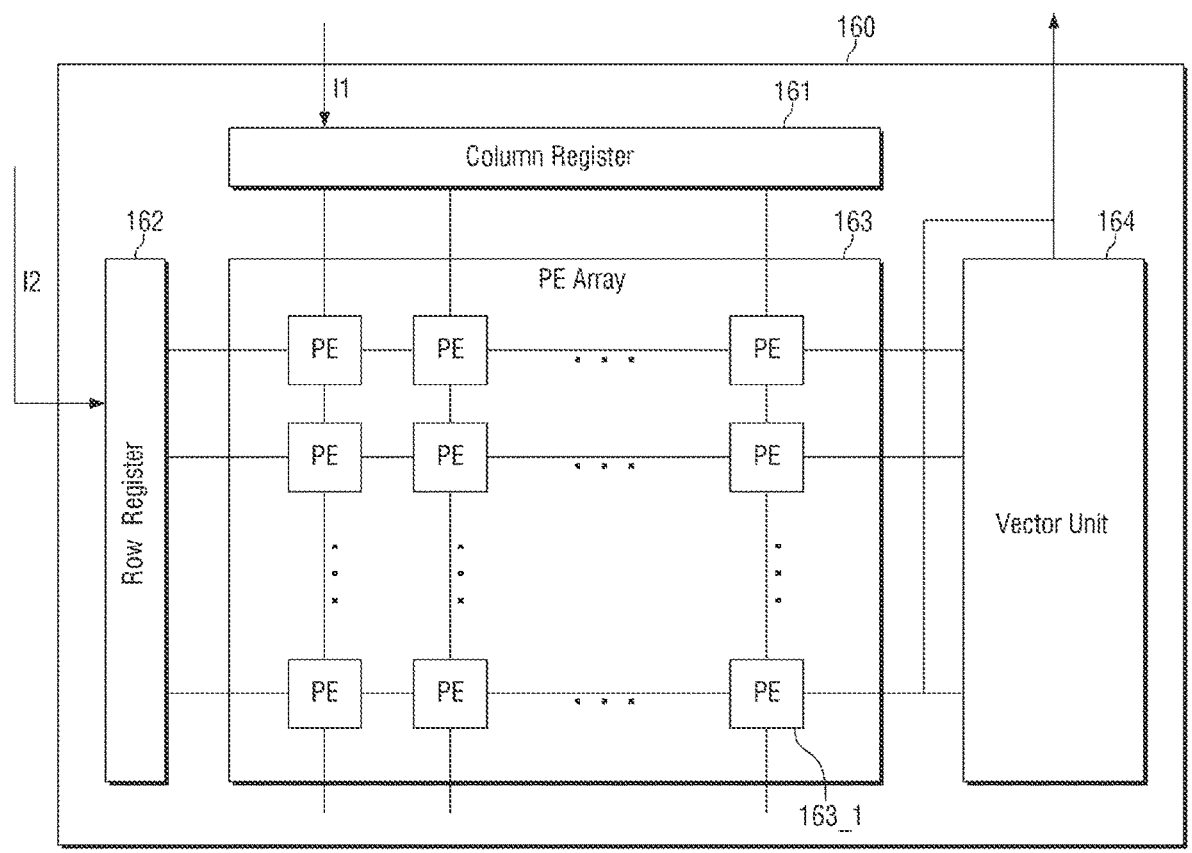
FIG. 11 is a block diagram for illustrating the processing unit of FIG. 9.

FIG. 11 is a block diagram for illustrating the processing unit of FIG. 9 in detail.

Referring to FIG. 9 and FIG. 11, the processing unit 160 may include a PE array 163, a vector unit 164, a column register 161, and a row register 162.

The PE array 163 may receive the input activation Act_In and the weight and perform multiplication on them. In this case, each of the input activation Act_In and the weight may be in the form of matrices and calculated via convolution. Through this, the PE array 163 may generate an output activation Act_Out. However, the embodiment is not limited thereto. The PE array 163 may generate any types of outputs other than the output activation Act_Out as well.

The PE array 163 may include at least one processing element (PE) 163_1. The processing elements 163_1 may be aligned with each other so that each of the processing elements 163_1 may perform multiplication on one input activation Act_In and one weight.

The PE array 163 may sum values for each multiplication to generate a subtotal. This subtotal may be utilized as an output activation Act_Out. The PE array 163 performs two-dimensional matrix multiplication, and thus, may be referred to as a 2D matrix compute unit.

The vector unit 164 may mainly perform one-dimensional calculations. The vector unit 164, together with the PE array 163, may perform deep learning calculations. Through this, the processing unit 160 may be specialized for necessary calculations. In some embodiments, each of the at least one neural core 100 has calculation modules that perform a large amount of two-dimensional matrix multiplications and one-dimensional calculations, and thus, can efficiently perform deep learning tasks.

The column register 161 may receive a first input I1. The column register 161 may receive the first input I1, and distribute them to each column of the processing elements 163_1.

The row register 162 may receive a second input I2. The row register 162 may receive the second input I2, and distribute them to each row of the processing elements 163_1.

The first input I1 may be an input activation Act_In or a weight. The second input I2 may be a value other than the first input I1 between the input activation Act_In or the weight. Alternatively, the first input I1 and the second input I2 may be values other than the input activation Act_In and the weight.

Figure 12:
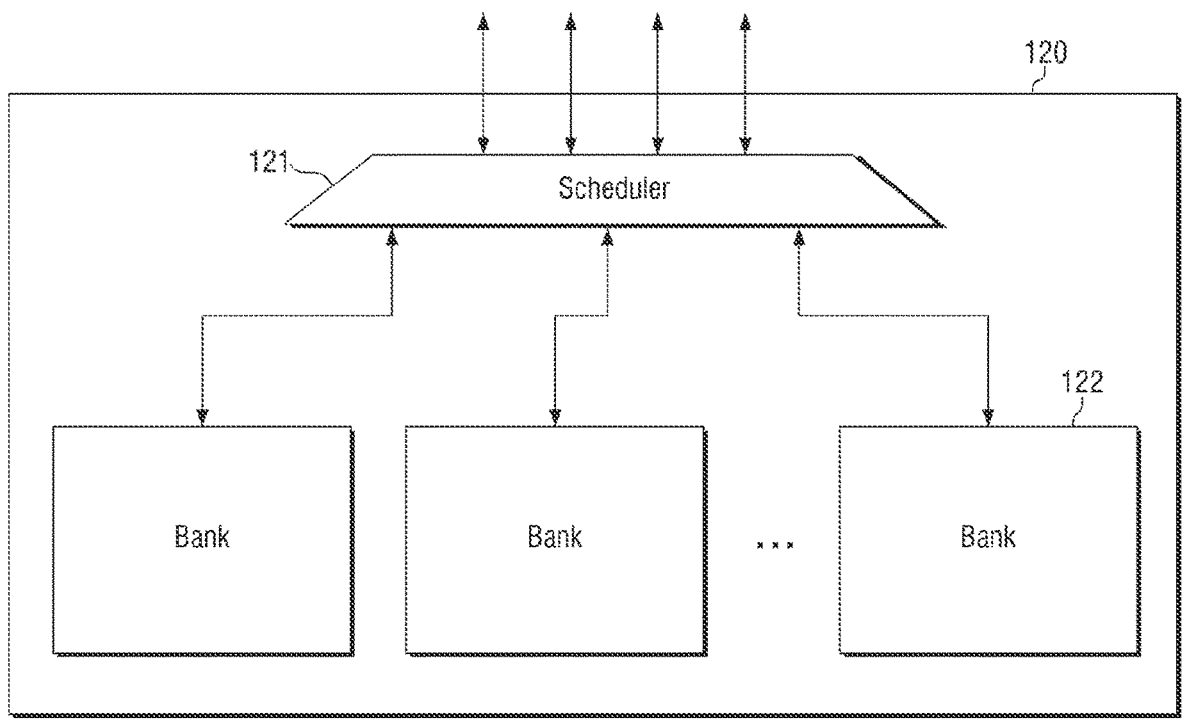
FIG. 12 is a block diagram for illustrating the L0 memory of FIG. 9 in detail.

FIG. 12 is a block diagram for illustrating the L0 memory of FIG. 9 in detail.

Referring to FIG. 12, the L0 memory 120 may include a scheduler 121 and one or more local memory banks 122.

When data is stored in the L0 memory 120, the scheduler 121 may receive data from the load engine 113a. In this case, the local memory bank 122 may be allocated for the data in a round-robin manner. Accordingly, data may be stored in any one of the local memory banks 122.

In contrast to this, when data is loaded from the L0 memory 120, the scheduler 121 may receive the data from the local memory bank 122 and transmit the data to the store engine 113b. The store engine 113b may store the data in the outside through the local interconnection 200. In this case, the scheduler 121 may be referred to as a scheduler circuit, but for the sake of convenience, the terms are unified as a scheduler. In addition, the scheduler 121 may be implemented as a circuit or circuitry.

Figure 13:
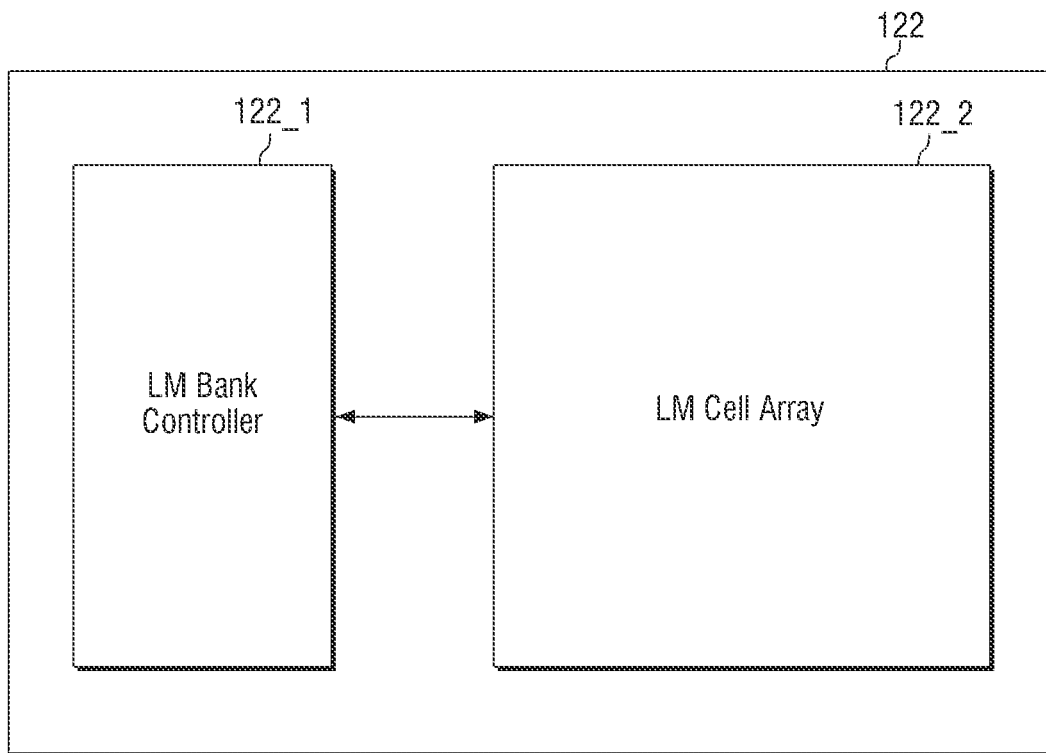
FIG. 13 is a block diagram for illustrating the local memory bank of FIG. 12.

FIG. 13 is a block diagram for illustrating the local memory bank of FIG. 12 in detail.

Referring to FIG. 13, the local memory bank 122 may include a local memory bank controller 122_1 and a local memory bank cell array 122_2.

The local memory bank controller 122_1 may manage read and write operations via the addresses of data stored in the local memory bank 122. In some embodiments, the local memory bank controller 122_1 may manage the input/output of data as a whole.

The local memory bank cell array 122_2 may be of a structure in which cells in which data is directly stored are arranged in rows and columns. The local memory bank cell array 122_2 may be controlled by the local memory bank controller 122_1.

Figure 14:
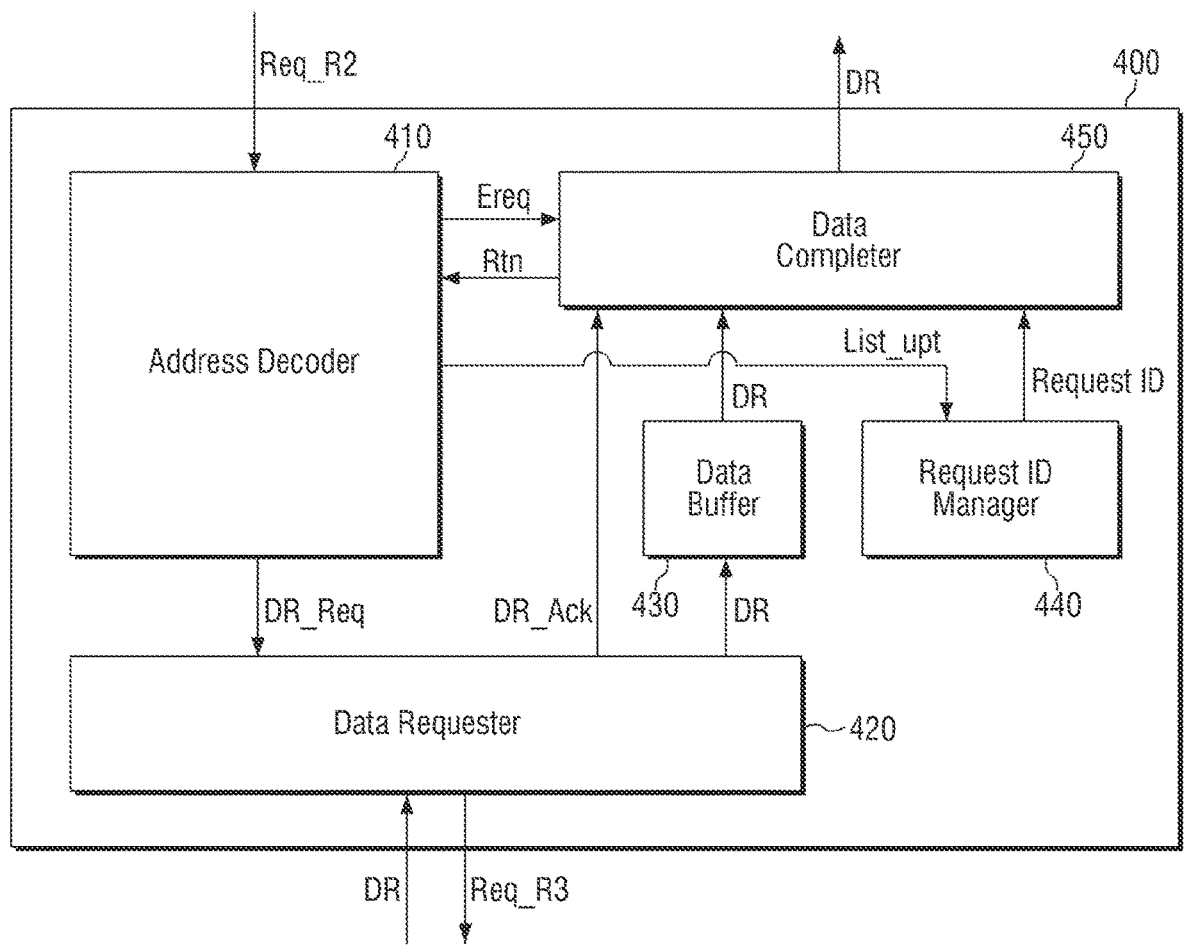
FIG. 14 is a block diagram for illustrating the neural processor cache of FIG. 5 in detail.

FIG. 14 is a block diagram for illustrating the neural processor cache of FIG. 5 in detail.

Referring to FIG. 14, the neural processor cache 400 may include an address decoder 410, a data requester 420, a data buffer 430, a request ID manager 440, and a data completer 450.

The address decoder 410, the data requester 420, the request ID manager 440, and the data completer 450 may be referred to respectively as an address decoder circuit, a data requester circuit, a request ID manager circuit, and a data completer circuit. However, for the sake of convenience, the terms are respectively unified as an address decoder, a data requester, a request ID manager, and a data completer. In addition, each of the address decoder 410, the data requester 420, the request ID manager 440, and the data completer 450 may be implemented as a circuit or circuitry.

The address decoder 410 may receive the second read request Req_R2. The address decoder 410 may identify a request ID and a memory address included in the second read request Req_R2. The address decoder 410 may determine whether the second read request Req_R2 is valid. If it is not valid, the address decoder 410 may transmit an exception request Ereq to the data completer 450. The data completer 450 may receive the exception request Ereq and transmit the exception request Ereq to the neural core 100 of FIG. 5.

In the case of a valid second read request Req_R2, the address decoder 410 may compare a memory address included in the second read request Req_R2 with previously received addresses which a memory address identifiers (IDs) are allocated. If the memory address is not allocated the memory address ID, the address decoder 410 may allocate the memory address a memory address ID. As used herein, the memory address ID may be referred to as the allocation ID. The address decoder 410 may record relation between the memory address IDs and the memory addresses in an address table and generate a list update signal List_upt including the memory address ID and the request ID. The address decoder 410 may transmit the list update signal List_upt to the request ID manager 440.

The address decoder 410 may generate a data read request DR_Req corresponding to the second read request Req_R2. The data read request DR_Req may be transmitted to the data requester 420 as a representative of the read requests having the same memory address as the second read request Req_R2. In some embodiments, as the same read requests of multiple times can be reduced to one read request, the efficiency of data transmission can be greatly improved.

The data requester 420 may receive the data read request DR_Req. The data requester 420 may generate a third read request Req_R3 via the data read request DR_Req. In some embodiments, the third read request Req_R3 may be substantially the same as the data read request DR_Req. In some embodiments, the third read request Req_R3 may be a request obtained by adding some information to the data read request DR_Req. The data requester 420 may transmit the third read request Req_R3 to the global interconnection 6000.

The data requester 420 may receive read data DR in response to the third read request Req_R3. The data requester 420 may receive the read data DR and transfer the read data DR to the data buffer 430. The data requester 420 may also transmit a read data acknowledgment signal DR_Ack to the data completer 450. In some embodiments, the read data acknowledgment signal DR_Ack may be a signal indicating that data read has been performed.

The data buffer 430 may receive and store the read data DR. The data buffer 430 may include SRAM, but the embodiment is not limited thereto. The data buffer 430 may temporarily store the read data DR and then transmit the read data DR to the data completer 450. In some embodiments, when the data completer 450 sends a signal requesting the data buffer 430 to transmit the read data DR, the data buffer 430 may transmit the read data DR to the data completer 450.

The request ID manager 440 may receive the list update signal List_upt and update a linked-list head/tail table and a request ID table. The request ID manager 440 may transmit request ID to the data completer 450.

The data completer 450 may receive the request ID. The data completer 450 may receive the read data DR and transmit the read data DR to the neural core that issued the read request according to the request ID.

Further, the data completer 450 may transmit a return signal Rtn for unbinding a memory address ID to the address decoder 410 if the data completer 450 has transmitted the read data DR. The address decoder 410 may receive the return signal Rtn and unbind the memory address ID.

Figure 15:
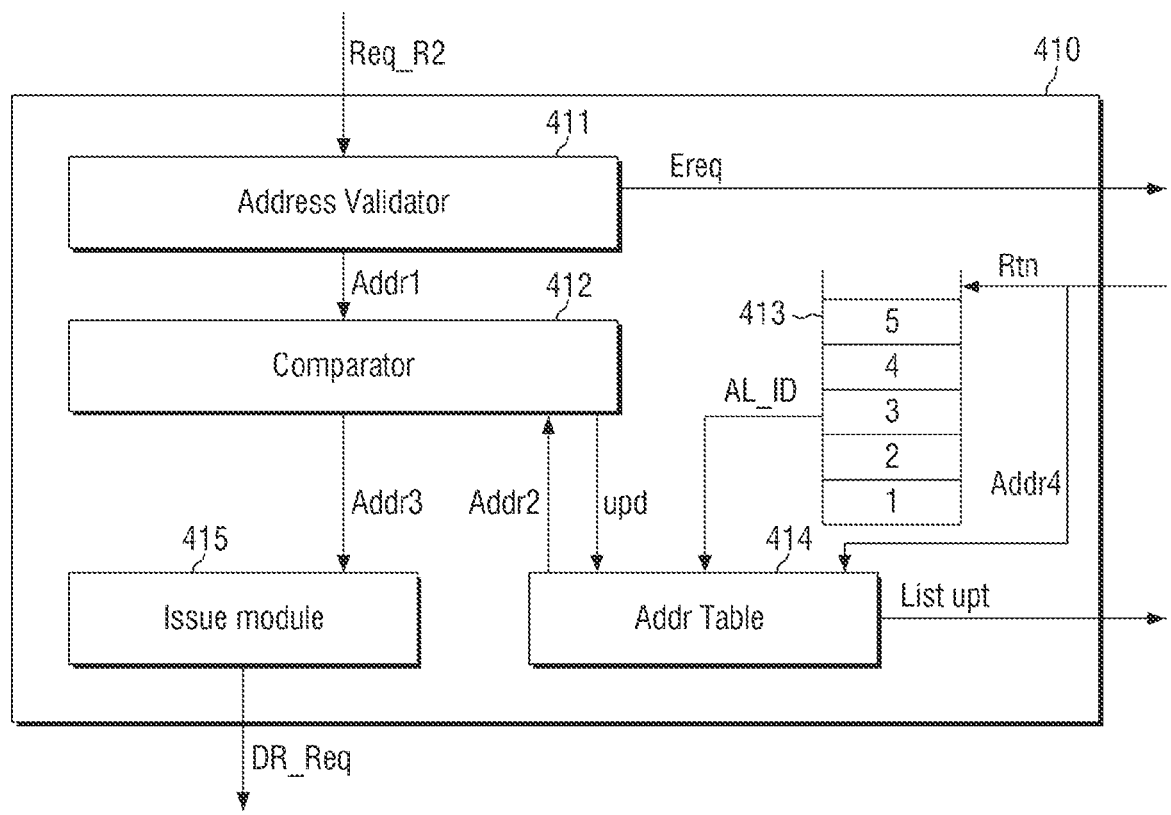
FIG. 15 is a block diagram for illustrating the address decoder of FIG. 14 in detail.

FIG. 15 is a block diagram for illustrating the address decoder of FIG. 14 in detail.

Referring to FIGS. 14 and 15, the address decoder 410 may include an address validator 411, a comparator 412, an allocation free list 413, an address table 414, and an issue module 415.

The address validator 411, the comparator 412, the allocation free list 413, the address table 414, and the issue module 415 may be referred to as an address validator circuit, a comparator circuit, an allocation free list circuit, an address table circuit, and an issue circuit, respectively. However, for the sake of convenience, the terms are unified as an address validator, a comparator, an allocation free list, an address table, and an issue module. In addition, each of the address validator 411, the comparator 412, the allocation free list 413, the address table 414, and the issue module 415 may be implemented as a circuit or circuitry.

The address validator 411 may receive the second read request Req_R2. The address validator 411 may check whether the second read request Req_R2 is valid. If the second read request Req_R2 is not valid, the address validator 411 may generate an exception request Ereq for handling exceptions and transmit the exception request Ereq to the data completer 450 of FIG. 14. If a read request for the same address comes from the same neural core, the address validator 411 may determine that the read request is not valid.

If the second read request Req_R2 is valid, the address validator 411 may separate a memory address Addr1 from the second read request Req_R2. The address validator 411 may transmit the memory address Addr1 to the comparator 412.

The comparator 412 may receive the memory address Addr1. The comparator 412 may receive memory addresses Addr2 stored in the address table 414. As used herein, the memory addresses Addr2 stored in the address table 414 may be referred to as allocation addresses. The comparator 412 may compare the memory address Addr1 and the memory addresses Addr2 and determine whether the memory address Addr1 is stored in the address table 414.

The comparator 412 may compare the memory addresses Addr2 and the memory address Addr1, and transmit the memory address ADDr1 as a request address Addr3 for requesting read data to the issue module 415 in order to perform a new data read if the memory address Addr1 is not stored in the address table 414. At the same time, in order to register the memory address ADDr1 as a new address, the memory address ADDr1 is passed on to the address table 414 as update information upd.

The comparator 412 may generate update information upd through matching result, i.e., comparison result. In some embodiments, the update information upd may include a request ID and the memory address of the second read request Req_R2. In some embodiments, the update information upd may include information for allocating one memory address ID AL_ID to the same address, or information to update the list of the request ID manager 440 when an input of the same address as an existing address that is already requested is received. The comparator 412 may transmit the update information upd to the address table 414.

The allocation free list 413 may be a memory that stores allocable memory address IDs AL_ID. In some embodiments, the allocation free list 413 may provide memory address IDs AL_ID to the address table 414 in sequence in a first in, first out (FIFO) structure. A memory address ID AL_ID allocated once may also be unbound according to the return signal Rtn and inputted again to the allocation free list 413 when the data read is completed. In some embodiments, in the allocation free list 413, the order of being allocated may also be determined according to the order of being inputted into the allocation free list 413, and the memory address ID AL_ID may be allocated.

The address table 414 may receive the memory address ID AL_ID, allocate the memory address ID AL_ID to the request address Addr3 that needs a new allocation from the comparator 412, and record the memory address ID AL_ID. Read requests having the same memory address but different request IDs may be stored in the same row. As for the return address Addr4 that comes with the return signal Rtn, previously recorded address information can be invalidated. The address table 414 may generate and transfer the list update signal List_upt to the request ID manager 440.

The address table 414 may include a memory that stores memory addresses which are allocated memory address identifiers. In some embodiments, the memory including the address table 414 may includes a plurality of memory units, each of which is associated with a respective one of memory address identifiers. In some embodiments, each of the plurality of memory address identifiers may point to a location of an associated memory unit. When the memory address Addr1 is not stored in the memory of the address table 414, the address table 414 may allocate the memory address Addr1 an allocable memory address identifier among a plurality of allocable memory address identifiers, and store the memory address Addr1 to a memory unit pointed to by the allocated memory address identifier.

The issue module 415 may receive the memory address Addr1, i.e., the request address Addr3, and generate a data read request DR_Req. The issue module 415 may transmit the data read request DR_Req to the data requester 420.

Figure 16:
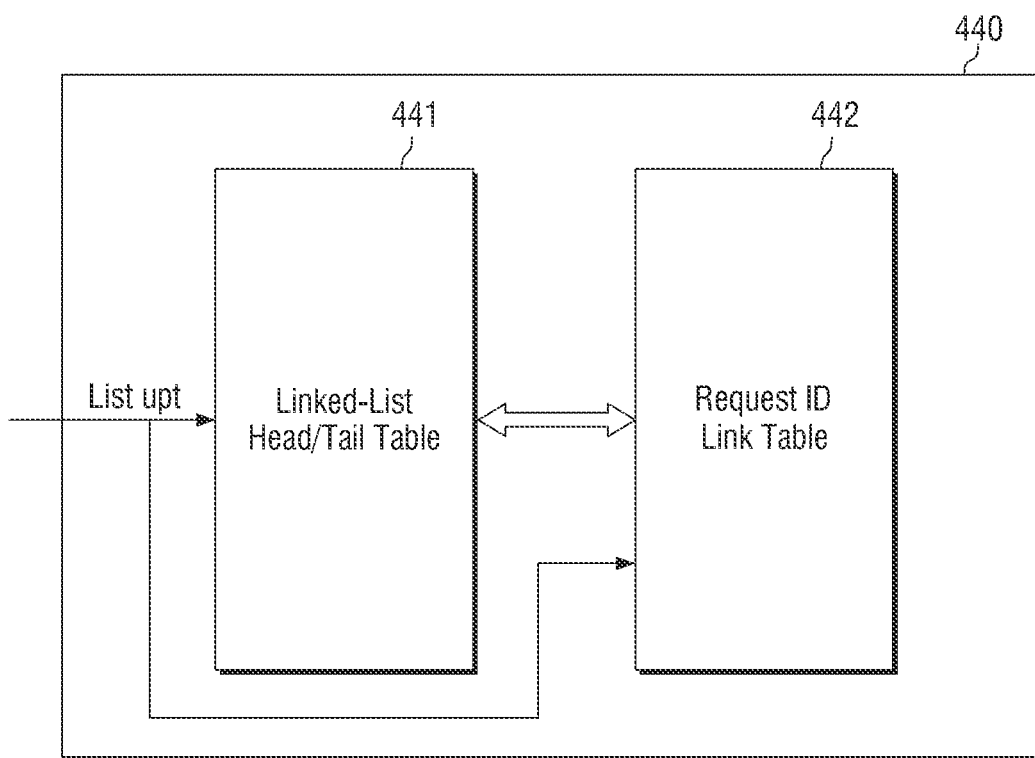
FIG. 16 is a block diagram for illustrating the request ID manager of FIG. 14 in detail.

FIG. 16 is a block diagram for illustrating the request ID manager of FIG. 14 in detail.

Referring to FIG. 16, the request ID manager 440 may include a linked-list head/tail table 441 and a request ID link table 442.

The linked-list head/tail table 441 and the request ID link table 442 may be referred to respectively as a linked-list head/tail table circuit and a request ID link table circuit. However, for the sake of convenience, the terms are unified as a linked-list head/tail table and a request ID link table. In addition, each of the linked-list head/tail table 441 and the request ID link table 442 may each be implemented as a circuit or circuitry.

The linked-list head/tail table 441 may be a memory storing start (i.e., head) request IDs and end (i.e., tail) request IDs of the request ID link table 442. Here, the head request ID may be referred to as a request ID of the read request received first for the same memory address Addr1. The tail request ID may be referred to as a request ID of the read request received last for the same memory address Addr1. The list update signal List_upt may update the tail request ID if the memory address Addr1 is matched.

In some embodiments, the memory including the linked-list head/tail table 441 may include a plurality of memory units. Each of the plurality of memory units may be associated with a respective one of a plurality of memory address identifiers. Each of the plurality of memory units may store a head request identifier and a tail request identifier for an associated memory address identifier.

The request ID link table 442 may be a memory storing a plurality of request ID lists, each of which is associated with a respective one of the plurality of the memory address identifiers. In some embodiments, each of the plurality of request ID lists may include a plurality of request IDs requesting data in a memory address identified by an associated memory address identifier. In some embodiments, the memory including the request ID link table 442 may include a plurality of memory units, each of which is associated with a respective one of a plurality of request identifiers.

For example, if an old tail request ID in the linked-list head/tail table 441 is number 2 and a newly updated request ID received from the address decoder 410 is number 4, then 4 may be recorded in link information at row 2 of the request ID link table 442. This record may continue to grow as the number of updated request IDs increases. In some embodiments, links having an order such as 2→4→3→1 may be continuously recorded in rows corresponding to the request ID link table 442.

Figure 17:
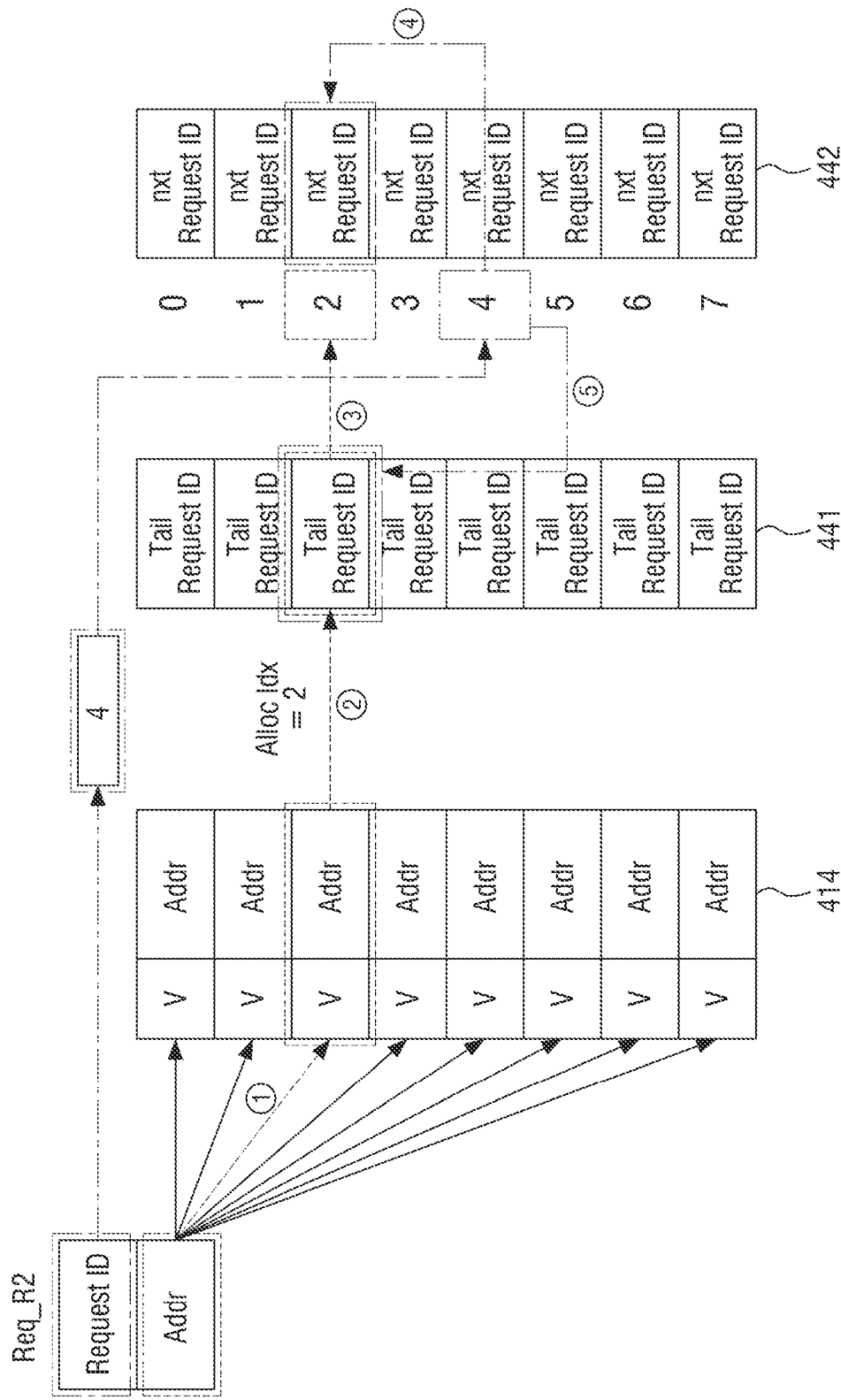
FIG. 17 is a conceptual diagram for illustrating an update operation of the address decoder and the request ID manager of FIG. 14.

FIG. 17 is a conceptual diagram for illustrating an update operation of the address decoder and the request ID manager of FIG. 14.

In FIG. 17, ARID stands for the request ID, V stands for "valid", and Alloc Idx stands for the memory address identifier.

Referring to FIGS. 14, 16, and 17, the second read request Req_R2 may include a request ID and a memory address Addr1. The NPC 400 may add the request ID to a request ID list associated with a memory address identifier allocated to the memory address Addr1. In some embodiments, the NPC 400 may locate a memory unit pointed to by the allocated memory address identifier in the linked-list head/tail table 441 to obtain a tail request identifier. The NPC 400 may locate a memory unit pointed to by the tail request identifier in the request ID link table 442. The NPC 400 may store the request identifier of the second read request to the memory unit pointed to by the tail request identifier in the request ID link table 442. The NPC 400 may write the request identifier of the memory read request in a memory unit pointed to by the allocated memory address identifier in the linked-list head/tail table 441.

For example, the description will be made assuming that the request ID is number 4 for convenience. When the memory address Addr1 is found (①), a memory address ID AL_ID corresponding to the memory address Addr1 is checked (②). In FIG. 17, for example, the memory address ID AL_ID may be number 2. Next, a tail request ID is checked by checking the linked-list head/tail table 441 corresponding to the memory address ID AL_ID (③). In FIG. 17, for example, the tail request ID may be number 2. This may be a value irrelevant to the memory address ID AL_ID. Next, since the tail request ID is number 2, number 4 for a new request ID is recorded in the 2nd memory unit of the request ID link table 442 (④). Next, number 4 in the request ID link table 442 becomes a new tail request ID, and the tail request ID in the linked-list head/tail table 441 is updated (⑤). In this way, links in the request ID link table 442 can be generated successively.

In more detail, the second read request Req_R2 including a request ID and a memory address Addr1 is received. The NPC 400 may add the request ID to a request ID list associated with a memory address identifier allocated to the memory address Addr1. First, it is identified that the memory address Addr1 is allocated the memory address identifier 2. The NPC 400 may locate the 2nd memory unit pointed to by the allocated memory address identifier 2 in the linked-list head/tail table 441 to obtain a tail request identifier 2. The NPC 400 may locate a 2nd memory unit pointed to by the tail request identifier 2 in the request ID link table 442. The NPC 400 may store the request identifier 4 of the second read request to the 2nd memory unit pointed to by the tail request identifier 2 in the request ID link table 442. Next, the NPC 400 may write the request identifier 4 of the memory read request as the tail request identifier in a memory unit pointed to by the allocated memory address identifier 2 in the linked-list head/tail table 441.

Figure 18:
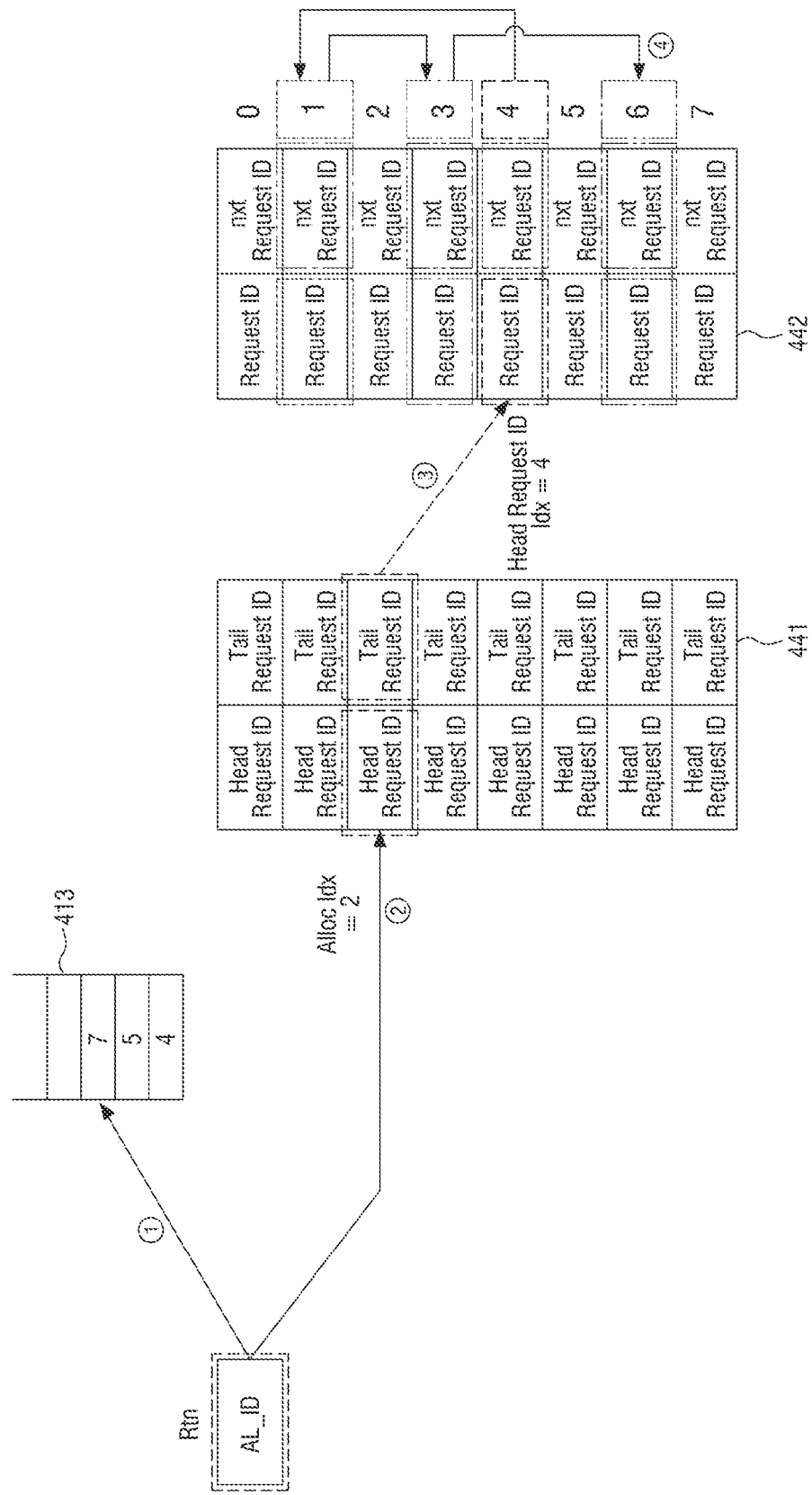
FIG. 18 is a conceptual diagram for illustrating an unbinding operation of the address decoder and the request ID manager of FIG. 14.

FIG. 18 is a conceptual diagram for illustrating a data return operation of the data completer and the request ID manager of FIG. 14.

Referring to FIGS. 14, 16, and 18, the return signal Rtn is generated inside the data completer 450 and may include the memory address ID AL_ID. In FIG. 18, the memory address ID AL_ID may be number 2, for example. The data completer 450 may transmit a signal to the address decoder 410 and de-allocate the memory address ID AL_ID (①).

In some embodiments, the NPC 400 may access the memory based on the head request identifier and the tail request identifier to obtain the one or more request identifiers requesting data in a memory address indicated by an associated memory address identifier. In some embodiments, the NPC 400 may read a memory unit pointed to by the head request identifier to obtain a next request identifier and read a memory unit pointed to by the next request identifier unless the next request identifier is the tail request identifier to obtain the one or more request identifiers which requested data of a memory address identified by the allocated memory address identifier.

For example, as shown in FIG. 18, following ①, the NPC 400 may access the 2nd memory unit in the linked-list head/tail table 441 pointed to by the memory address ID 2 AL_ID to obtain the head request ID 4 as a request ID associated with the allocated memory address identifier. Also, the NPC 400 may obtain the tail request ID 6 in the 2nd memory unit in the linked-list head/tail table 441. Next, the NPC 400 may read the 4th memory unit pointed to by the head request identifier 4 to obtain a next request identifier 1 as a request ID associated with the allocated memory address identifier. The NPC 400 may read the 1st memory unit pointed to by the request identifier 1 to obtain a next request identifier 3 as a request ID associated with the allocated memory address identifier. The NPC 400 may read the 3rd memory unit pointed to by the request identifier 3 to obtain a next request identifier 6 as a request ID associated with the allocated memory address identifier. Since the next request identifier is equal to the tail request ID, the NPC 400 may stop read the request ID link table 442. In some embodiments, the request ID of number 4 is read first, and since the next request ID corresponding to number 4 in the request ID link table is number 1, the request ID of number 1 is also read. In this way, all request IDs are read in the order of 4→1→3→6.

In some embodiments, if the last request ID in the request ID link table 442 is the same as the tail request ID in the linked-list head/tail table 441 of the memory address ID AL_ID, the process of reading the linked list may end at that time. For example, since number 6 is the value of the linked-list head/tail table 441 of the memory address ID AL_ID, the operation of reading the request ID of number 6 may be the last.

The embodiment can maximize the efficiency of data transmission by collecting all read requests for the same address and efficiently merging them into one request, and minimize the delay of requests, thereby preventing the speed of the entire device from decreasing.

Figure 19:
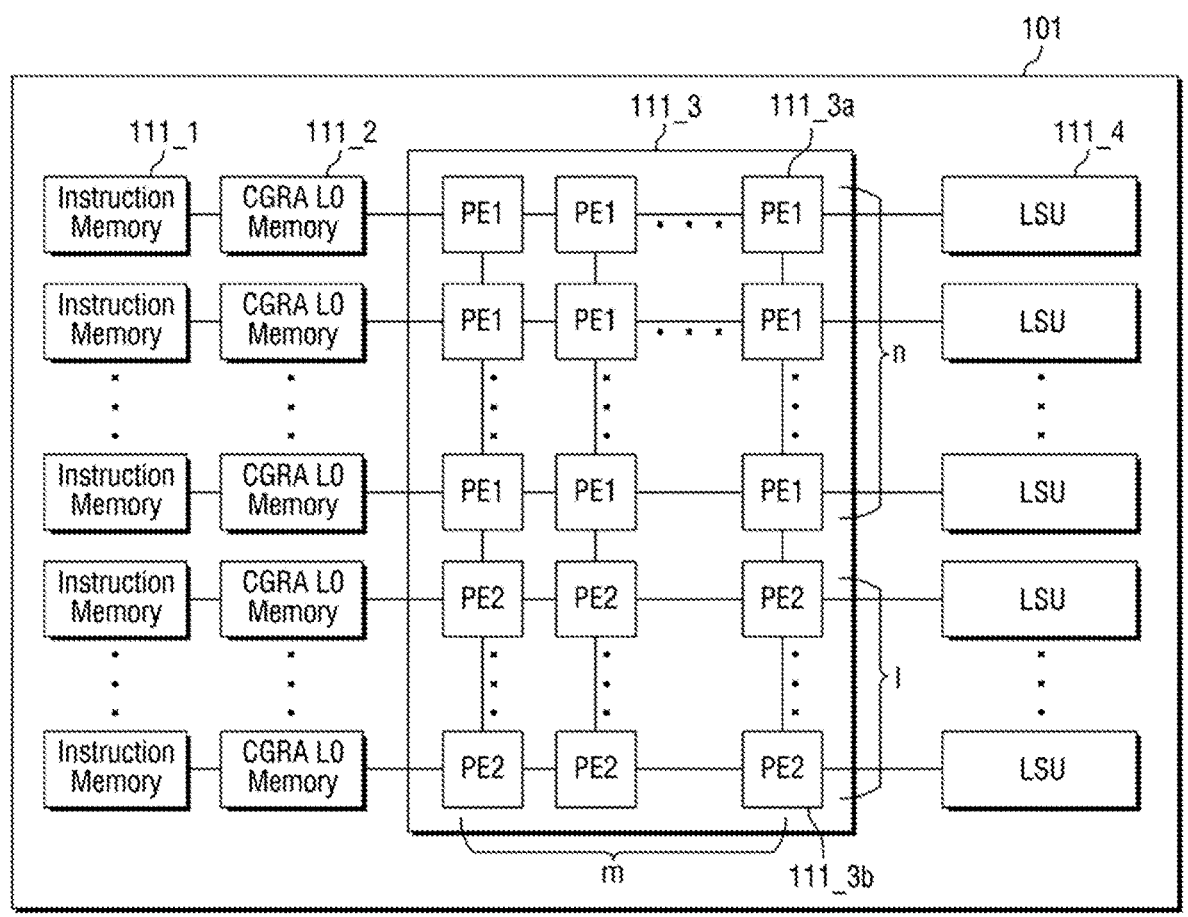
FIG. 19 is a block diagram for illustrating the structure of the neural processing device of FIG. 1 in detail.

FIG. 19 is a block diagram for illustrating in detail the structure of the neural processing device in accordance with some embodiments of the disclosure.

Referring to FIG. 19, a neural core 101 may have a CGRA structure, unlike a neural core 100. The neural core 101 may include an instruction memory 111_1, a CGRA L0 memory 111_2, a PE array 111_3, and a load/store unit (LSU) 111_4. The PE array 111_3 may include a plurality of processing elements interconnected by a mesh style network. The mesh style network may be two-dimensional, three-dimensional, or higher-dimensional. In the CGRA, the plurality of processing elements may be reconfigurable or programmable. The interconnection between the plurality of processing elements may be reconfigurable or programmable. In some embodiments, the interconnection between the plurality of processing elements may be statically reconfigurable or programmable when the interconnection is fixed after the plurality of processing elements are configured or programed. In some embodiments, the interconnection between the plurality of processing elements may be dynamically reconfigurable or programmable when the interconnection is reconfigurable or programmable even after the plurality of processing elements are configured or programed.

The instruction memory 111_1 may receive and store instructions. The instruction memory 111_1 may sequentially store instructions internally, and provide the stored instructions to the PE array 111_3. In this case, the instructions may instruct the operation of first type of a plurality of processing elements 111_3a included in each PE array 111_3.

The CGRA L0 memory 111_2 may be located inside the neural core 101, receive all input data required for tasks of the neural core 101, and temporarily store the data. In addition, the CGRA L0 memory 111_2 may temporarily store output data calculated by the neural core 101 to transmit the data to the outside. The CGRA L0 memory 111_2 may serve as a cache memory of the neural core 101.

The CGRA L0 memory 111_2 may send and receive data to and from the PE array 111_3. The CGRA L0 memory 111_2 may be a memory corresponding to L0 (level 0) that is lower than L1. In this case, the L0 memory may be a private memory of the neural core 101 that is not shared. The CGRA L0 memory 111_2 may transmit data such as activations or weights, programs, and the like to the PE array 111_3.

The PE array 111_3 may be a module that performs calculations. The PE array 111_3 may perform not only one-dimensional calculations but also two-dimensional or higher matrix/tensor calculations. The PE array 111_3 may include the first type of the plurality of processing elements 111_3a and a second type of a plurality of processing elements 111_3b therein.

The first type of the plurality of processing elements 111_3a and the second type of the plurality of processing elements 111_3b may be arranged in rows and columns. The first type of the plurality of processing elements 111_3a and the second type of the plurality of processing elements 111_3b may be arranged in m columns. In addition, the first type of the plurality of processing elements 111_3a may be arranged in n rows, and the second type of the plurality of processing elements 111_3b may be arranged in 1 rows. Accordingly, the first type of the plurality of processing elements 111_3a and the second type of the plurality of processing element 111_3b may be arranged in (n+1) rows and m columns.

The first type of the plurality of processing elements 111_3a and the second type of the plurality of processing elements 111_3b may be arranged in rows and columns. The first type of the plurality of processing elements 111_3a and the second type of the plurality of processing elements 111_3b may be arranged in m columns. In addition, the first type of the plurality of processing elements 111_3a may be arranged in n rows, and the second type of the plurality of processing elements 111_3b may be arranged in 1 rows. Accordingly, the first type of the plurality of processing elements 111_3a and the second type of the plurality of processing element 111_3b may be arranged in (n+1) rows and m columns.

The neural core 101 may have a CGRA (Coarse Grained Reconfigurable Architecture) structure. Accordingly, in the neural core 101, each of the first type of the plurality of processing elements 111_3a and the second type of the plurality of processing elements 111_3b of the PE array 111_3 may be connected to at least one of the CGRA L0 memory 111_2, the instruction memory 111_1, or the LSU 111_4, respectively. In some embodiments, the first type of the plurality of processing elements 111_3a and the second type of the plurality of processing elements 111_3b do not have to be connected to all of the CGRA L0 memory 111_2, the instruction memory 111_1, and the LSU 111_4, but may be connected to some thereof.

Further, the first type of the plurality of processing elements 111_3a and the second type of the plurality of processing elements 111_3b may be different types of processing elements from each other. Accordingly, out of the CGRA L0 memory 111_2, the instruction memory 111_1, and the LSU 111_4, the elements connected to the first type of the plurality of processing elements 111_3a and the elements connected to the second type of the plurality of processing elements 111_3b may be different from each other.

The neural core 101 of the disclosure having a CGRA structure enables high-level parallel calculations, and since direct data exchange between the first type of the plurality of processing elements 111_3a and the second type of the plurality of processing elements 111_3b is possible, the power consumption may be low. In addition, by including two or more types of processing elements, optimization according to various calculation tasks may also be possible.

For example, if the first type of the plurality of processing elements 111_3a are processing elements that perform two-dimensional calculations, the second type of the plurality of processing elements 111_3b may be processing elements that perform one-dimensional calculations. However, the embodiment is not limited thereto.

Figure 20:
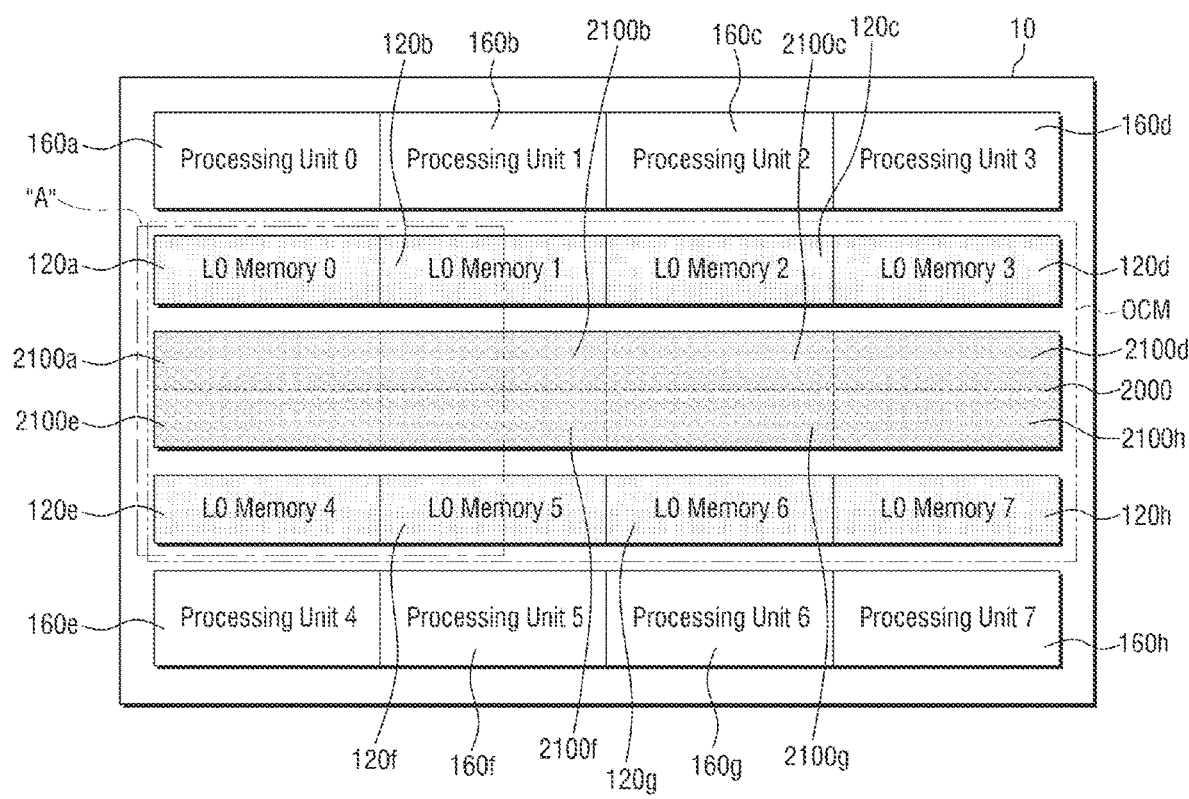
FIG. 20 is a block diagram for illustrating the memory reconstruction of the neural processing system of FIG. 1.

FIG. 20 is a block diagram for illustrating memory reconfiguration of a neural processing system in accordance with some embodiments of the disclosure.

Referring to FIG. 20, the neural core SoC 10 may include first to eighth processing units 160a to 160h and an on-chip memory OCM. Although FIG. 20 illustrates eight processing units as an example, this is merely illustrative, and the number of processing units may vary as desired.

The on-chip memory OCM may include first to eighth L0 memories 120a to 120h and a shared memory 2000.

The first to eighth L0 memories 120a to 120h may be used as private memories for the first to eighth processing units 160a to 160h, respectively. In some embodiments, the first to eighth processing units 160a to 160h and the first to eighth L0 memories 120a to 120h may correspond to each other 1:1.

The shared memory 2000 may include first to eighth memory units 2100a to 2100h. The first to eighth memory units 2100a to 2100h may correspond to the first to eighth processing units 160a to 160h and the first to eighth L0 memories 120a to 120h, respectively. In some embodiments, the number of memory units may be eight, which is the same as the number of processing units and L0 memories.

The shared memory 2000 may operate in one of two kinds of on-chip memory types. In some embodiments, the shared memory 2000 may operate in one of a L0 memory type or a global memory type. In some embodiments, the shared memory 2000 may implement two types of logical memories with one piece of hardware.

If the shared memory 2000 is implemented in the L0 memory type, the shared memory 2000 may operate as a private memory for each of the first to eighth processing units 160a to 160h, just like the first to eighth L0 memories 120a to 120h. The L0 memory can operate at a relatively higher clock speed compared with the global memory, and the shared memory 2000 may also use a relatively higher clock speed when operating in the L0 memory type.

If the shared memory 2000 is implemented in the global memory type, the shared memory 2000 may operate as a common memory used by the first processing unit 160a and the second processing unit 160b together. In this case, the shared memory 2000 may be shared not only by the first to eighth processing units 160a to 160h but also by the first to eighth L0 memories 120a to 120h.

The global memory may generally use a lower clock compared with the L0 memory, but is not limited thereto. When the shared memory 2000 operates in the global memory type, the first to eighth processing units 160a to 160h may share the shared memory 2000. In this case, the shared memory 2000 may be connected to the volatile memory 32 of FIG. 2 via the global interconnection 6000 and may also operate as a buffer for the volatile memory 32.

At least part of the shared memory 2000 may operate in the L0 memory type, and the rest may operate in the global memory type. In some embodiments, the entire shared memory 2000 may operate in the L0 memory type, or the entire shared memory 2000 may operate in the global memory type. Alternatively, part of the shared memory 2000 may operate in the L0 memory type, and the rest may operate in the global memory type.

Figure 21:
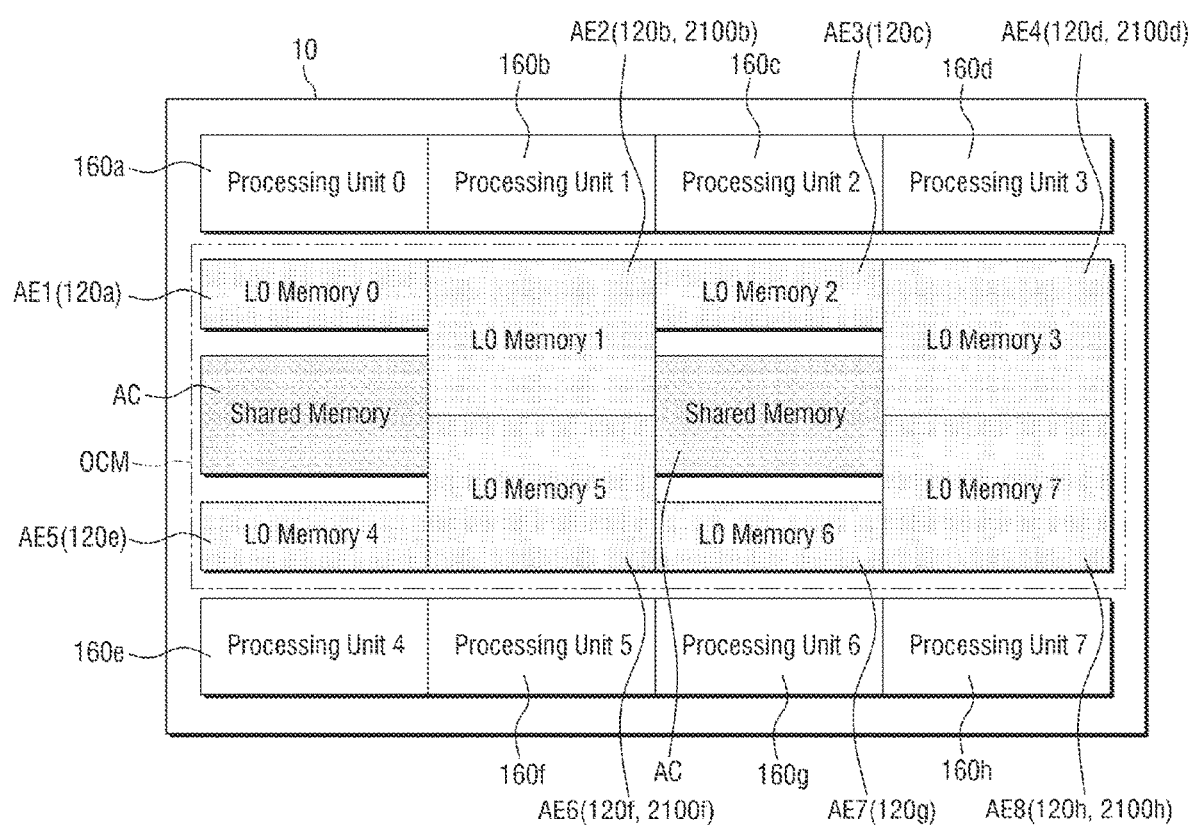
FIG. 21 is a block diagram showing an example of the memory reconstruction of the neural processing system of FIG. 1.

FIG. 21 is a block diagram showing an example of memory reconstruction of a neural processing system in accordance with some embodiments of the disclosure.

With reference to FIGS. 20 and 21, first, third, fifth, and seventh dedicated areas AE1, AE3, AE5, and AE7 for each of the first, third, fifth, and seventh processing units 160a, 160c, 160e, and 160g may include only the first, third, fifth, and seventh L0 memories 120a, 120c, 120e, and 120g, respectively. Further, second, fourth, sixth, and eighth dedicated areas AE2, AE4, AE6, and AE8 for each of the second, fourth, sixth, and eighth processing units 160b, 160d, 160f, and 160h may include second, fourth, sixth, and eighth L0 memories 120b, 120d, 120f, and 120h, respectively. In addition, the second, fourth, sixth, and eighth dedicated areas AE2, AE4, AE6, and AE8 may include the second, fourth, sixth, and eighth memory units 2100b, 2100d, 2100f, and 2100h. The first, third, fifth, and seventh memory units 2100a, 2100c, 2100e, and 2100g of the shared memory 2000 may be used as a common area AC.

The common area AC may be a memory shared by the first to eighth processing units 160a to 160h. The second dedicated area AE2 may include a second L0 memory 120b and a second memory unit 2100b. The second dedicated area AE2 may be an area in which the second L0 memory 120b and the second memory unit 2100b that are separated hardware-wise operate in the same manner and operate logically as one L0 memory. The fourth, sixth, and eighth dedicated areas AE4, AE6, and AE8 may also operate in the same manner as the second dedicated area AE2.

The shared memory 2000 in accordance with the embodiment may convert an area corresponding to each processing unit into a logical L0 memory and a logical global memory of an optimized ratio and may use them. The shared memory 2000 may perform the adjustment of this ratio at runtime.

In some embodiments, each processing unit may perform the same task in some cases, but may perform different tasks in other cases as well. In this case, the amount of the L0 memory and the amount of the global memory required for the tasks carried out by each processing unit are inevitably different each time. Accordingly, if the composition ratio of the L0 memory and the shared memory is fixedly set as in the conventional on-chip memory, there may occur inefficiency due to the calculation tasks assigned to each processing unit.

Therefore, the shared memory 2000 of the neural processing device in accordance with the embodiment may set an optimal ratio of the L0 memory and the global memory according to calculation tasks during the runtime, and may enhance the efficiency and speed of calculation.

Figure 22:
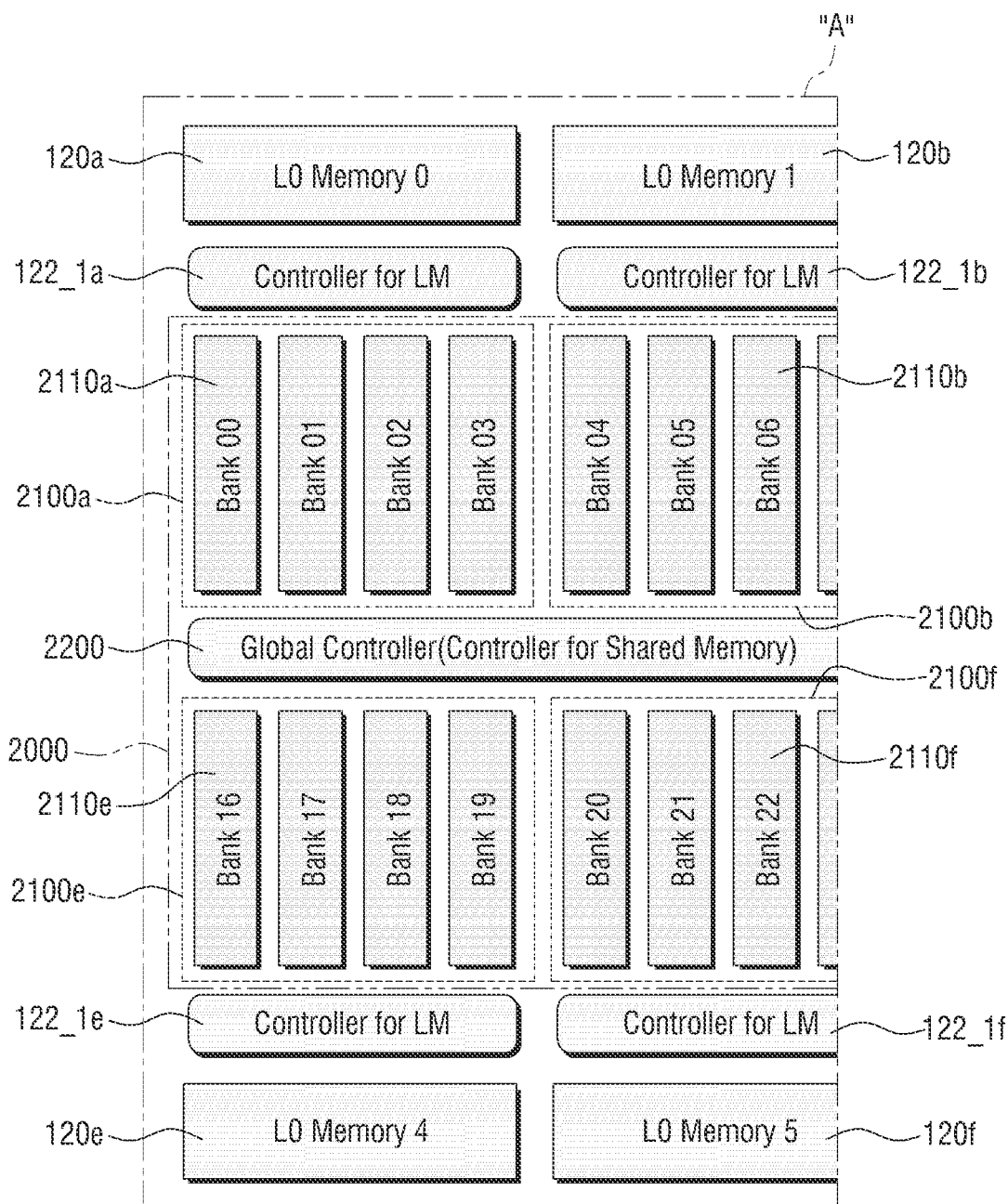
FIG. 22 is an enlarged block diagram of a portion A of FIG. 20.

FIG. 22 is an enlarged block diagram of a portion A of FIG. 20.

With reference to FIGS. 20 and 22, the shared memory 2000 may include a first L0 memory controller 122_1a, a second L0 memory controller 122_1b, a fifth L0 memory controller 122_1e, a sixth L0 memory controller 122_1f, the first to eighth memory units 2100a to 2100h, and a global controller 2200. Other L0 memory controllers not shown may also be included in the embodiment, but the description thereof will be omitted for convenience.

The first L0 memory controller 122_1a, the second L0 memory controller 122_1b, the fifth L0 memory controller 122_1e, the sixth L0 memory controller 122_1f, and the global controller 2200 may be referred to respectively as a first L0 memory controller circuit, a second L0 memory controller circuit, a fifth L0 memory controller circuit, a sixth L0 memory controller circuit, and a global controller circuit. However, for the sake of convenience, the terms are respectively unified as a first L0 memory controller, a second L0 memory controller, a fifth L0 memory controller, a sixth L0 memory controller, and a global controller. In addition, each of the first L0 memory controller 122_1a, the second L0 memory controller 122_1b, the fifth L0 memory controller 122_1e, the sixth L0 memory controller 122_1f, and the global controller 2200 may be implemented as a circuit or circuitry.

The first L0 memory controller 122_1a may control the first L0 memory 120a. In addition, the first L0 memory controller 122_1a may control the first memory unit 2100a. Specifically, when the first memory unit 2100a is implemented in a logical L0 memory type, the control by the first L0 memory controller 122_1a may be performed on the first memory unit 2100a.

The second L0 memory controller 122_1b may control the second L0 memory 120b. Further, the second L0 memory controller 122_1b may control the second memory unit 2100b. In some embodiments, when the second memory unit 2100b is implemented in the logical L0 memory type, the control by the first L0 memory controller 122_1a may be performed on the second memory unit 2100b.

The fifth L0 memory controller 122_1e may control the fifth L0 memory 120e. Further, the fifth L0 memory controller 122_1e may control the fifth memory unit 2100e. In some embodiments, when the fifth memory unit 2100e is implemented in the logical L0 memory type, the control by the fifth L0 memory controller 122_1e may be performed on the fifth memory unit 2100e.

The sixth L0 memory controller 122_1f may control the sixth L0 memory 120f. Further, the sixth L0 memory controller 122_1f may control the sixth memory unit 2100f. In some embodiments, when the sixth memory unit 2100f is implemented in the logical L0 memory type, the control by the sixth L0 memory controller 122_1f may be performed on the sixth memory unit 2100f.

The global controller 2200 may control all of the first to eighth memory units 2100a to 2100h. Specifically, the global controller 2200 may control the first memory unit 2100a to the eighth memory unit 2100h when the first to eighth memory units 2100a to 2100h each operate logically in the global memory type (i.e., when they do not operate logically in the L0 memory type).

In some embodiments, the first to eighth memory units 2100a to 2100h may be controlled by the first to eighth L0 memory controllers 122_1a to 122_1h, respectively, or may be controlled by the global controller 2200, depending on what type of memory they are logically implemented.

If the L0 memory controllers including the first, second, fifth, and sixth L0 memory controllers 122_1a, 122_1b, 122_1e, and 122_1f control the first to eighth memory units 2100a to 2100h, respectively, the first to eighth L0 memory controllers 122_1a to 122_1h control the first to eighth memory units 2100a to 2100h in the same manner as the first to eighth L0 memories 120a to 120h, and thus, can control them as the private memory of the first to eighth processing units 160a to 160h. Accordingly, the first to eighth memory units 2100a to 2100h may operate at clock frequencies corresponding to the clock frequencies of the first to eighth processing units 160a to 160h.

The L0 memory controllers including the first L0 memory controller 122_1a, the second L0 memory controller 122_1b, the fifth L0 memory controller 122_1e, and the sixth L0 memory controller 122_1f may each include the LSU 110 of FIG. 9.

If the global controller 2200 controls at least one of the first to eighth memory units 2100a to 2100h, respectively, then the global controller 2200 may control the first to eighth memory units 2100a to 2100h as the global memory of the first to eighth processing units 160a to 160h, respectively. Accordingly, at least one of the first to eighth memory units 2100a to 2100h may operate at a clock frequency independent of the clock frequencies of the first to eighth processing units 160a to 160h, respectively. In some embodiments, if the global controller 2200 controls the i-th memory unit among the first to eighth memory units 2100a to 2100h, the global controller 2200 may control the i-th memory unit as the global memory of the i-th processing unit, and the i-th memory unit may operate at a clock frequency independent of the clock frequency of the i-th processing unit. However, the embodiment is not limited thereto.

The global controller 2200 may connect the first to eighth memory units 2100a to 2100h to the global interconnection 6000 of FIG. 3. The first to eighth memory units 2100a to 2100h may exchange data with the off-chip memory 30 of FIG. 2 by the control of the global controller 2200 or may respectively exchange data with the first to eighth L0 memories 120a to 120h.

Each of the first to eighth memory units 2100a to 2100h may include at least one memory bank. The first memory unit 2100a may include at least one first memory bank 2110a. The first memory banks 2110a may be areas obtained by dividing the first memory unit 2100a into certain sizes. The first memory banks 2110a may all be memory devices of the same size. However, the embodiment is not limited thereto. FIG. 22 illustrates that four memory banks are included in one memory unit.

Similarly, the second, fifth, and sixth memory units 2100b, 2100e, and 2100f may include at least one second, fifth, and sixth memory banks 2110b, 2110e, and 2110f, respectively.

In the following, the description will be made based on the first memory banks 2110a and the fifth memory banks 2110e, which may be the same as other memory banks including the second and sixth memory banks 2110b and 2110f.

The first memory banks 2110a may each operate logically in the L0 memory type or operate logically in the global memory type. In this case, the first memory banks 2110a may operate independently of the other memory banks in the first memory unit 2100a. However, the embodiment is not limited thereto.

If each memory bank operates independently, the first memory unit 2100a may include a first area operating in the same manner as the first L0 memory 120a and a second area operating in a different manner from the first L0 memory 120a. In this case, the first area and the second area do not necessarily coexist, but any one area may take up the entire first memory unit 2100a.

Likewise, the second memory unit 2100b may include a third area operating in the same manner as the second L0 memory 120b and a fourth area operating in a different manner from the second L0 memory 120b. In this case, the third area and the fourth area do not necessarily coexist, and any one area may take up the entire first memory unit 2100a.

In this case, the ratio of the first area to the second area may be different from the ratio of the third area to the fourth area. However, the embodiment is not limited thereto. Therefore, the ratio of the first area to the second area may be the same as the ratio of the third area to the fourth area. In some embodiments, the memory composition ratio in each memory unit may vary as desired.

In general, in the case of the conventional system-on-chip, the on-chip memory except for high-speed L0 memory was often composed of high-density, low-power SRAM. This is because SRAM has high efficiency in terms of chip area and power consumption relative to required capacity. However, with the conventional on-chip memory, the processing speed slowed down significantly as was inevitable in the case where tasks that require more data quickly than the predetermined capacity of the L0 memory, and, even when the need for the global memory is not great, there is no way to utilize the remaining global memory, resulting in inefficiency.

On the other hand, the shared memory 2000 in accordance with some embodiments of the disclosure may be controlled selectively by any one of the two controllers depending on the case. In the case depicted, the shared memory 2000 may be controlled not only as a whole by a determined one of the two controllers but also independently for each memory unit or each memory bank.

Through this, the shared memory 2000 in accordance with the embodiment can obtain an optimal memory composition ratio according to calculation tasks during the runtime and can perform faster and more efficient calculation tasks. In the case of a processing unit specialized in artificial intelligence, the required sizes of L0 memory and global memory may vary for each particular application. Moreover, even for the same application, the required sizes of L0 memory and global memory may vary for each layer when a deep learning network is used. In the shared memory 2000, in accordance with the embodiment, the composition ratio of the memory can be changed during runtime even when calculation steps change according to each layer, making fast and efficient deep learning tasks possible.

Figure 23:
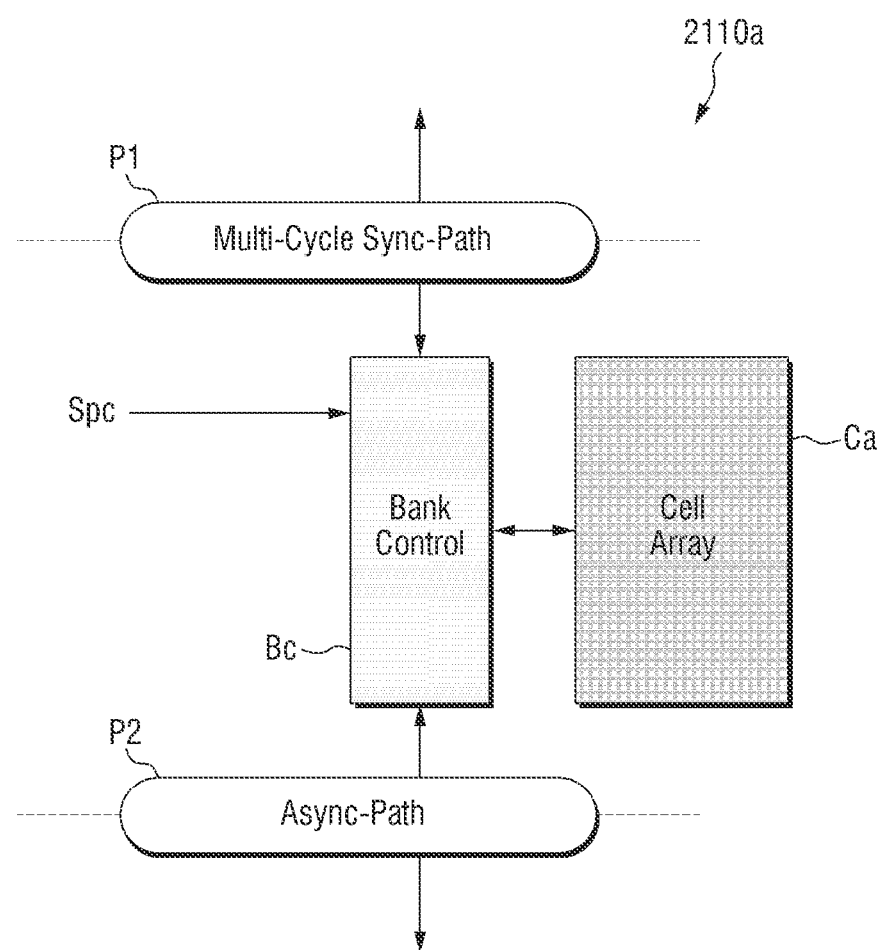
FIG. 23 is a block diagram for illustrating the first memory bank of FIG. 22 in detail.

FIG. 23 is a block diagram for illustrating the first memory bank of FIG. 22 in detail. Although FIG. 23 illustrates the first memory bank 2110a, other memory banks may also have the same structure as the first memory bank 2110a.

Referring to FIG. 23, the first memory bank 2110a may include a cell array Ca, a bank controller Bc, a first path unit P1, and a second path unit P2.

In this case, the bank controller Bc, the first path unit P1, and the second path unit P2 may be referred to respectively as a bank controller circuit, a first path unit circuit, and a second path unit circuit. However, for the sake of convenience, the terms are respectively unified as a bank controller, a first path unit, and a second path unit. In addition, each of the bank controller Bc, the first path unit P1, and the second path unit P2 may be implemented as a circuit or circuitry.

The cell array Ca may include a plurality of memory devices (cells) therein. In the cell array Ca, the plurality of memory devices may be arranged in a lattice structure. The cell array Ca may be, for example, a SRAM (static random-access memory) cell array.

The bank controller Bc may control the cell array Ca. The bank controller Bc may determine whether the cell array Ca operates in the L0 memory type or in the global memory type, and may control the cell array Ca according to the determined memory type.

Specifically, the bank controller Bc may determine whether to transmit and receive data in the direction of the first path unit P1 or to transmit and receive data in the direction of the second path unit P2 during the runtime. The bank controller Bc may determine a data transmission and reception direction according to a path control signal Spc.

The path control signal Spc may be generated by a pre-designed device driver or compiler. The path control signal Spc may be generated according to the characteristics of calculation tasks. Alternatively, the path control signal Spc may be generated by an input received from a user. In some embodiments, the user may directly apply an input to the path control signal Spc in order to select optimal memory composition ratio.

The bank controller Bc may determine a path along which the data stored in the cell array Ca are transmitted and received via the path control signal Spc. The exchange interface of data may be changed as the bank controller Bc determines the path along which the data are transmitted and received. In some embodiments, a first interface may be used when the bank controller Bc exchanges data with the first path unit P1, and a second interface may be used when the bank controller Bc exchanges data with the second path unit P2. In this case, the first interface and the second interface may be different from each other.

Also, address systems in which data are stored may vary as well. In some embodiments, if a particular interface is selected, then read and write operations may be performed in an address system corresponding thereto.

The bank controller Bc may operate at a particular clock frequency. For example, if the cell array Ca is an SRAM cell array, the bank controller Bc may operate at the operating clock frequency of a general SRAM.

The first path unit P1 may be connected to the bank controller Bc. The first path unit P1 may directly exchange the data of the cell array Ca with the first processing unit 160a. In this case, "directly" may mean being exchanged with each other without going through the global interconnection 6000. In some embodiments, the first processing unit 160a may exchange data directly with the first L0 memory 120a, and the first processing unit 160a may exchange data via the first path unit P1 when the shared memory 2000 is implemented logically in the L0 memory type. The first path unit P1 may include L0 memory controllers including the first L0 memory controller 122_1a and the second L0 memory controller 122_1b as shown in FIG. 22.

The first path unit P1 may form a multi-cycle sync-path. In some embodiments, the operating clock frequency of the first path unit P1 may be the same as the operating clock frequency of the first processing unit 160a. The first L0 memory 120a may quickly exchange data at the same clock frequency as the operating clock frequency of the first processing unit 160a in order to quickly exchange data at the same speed as the operation of the first processing unit 160a. Likewise, the first path unit P1 may also operate at the same clock frequency as the operating clock frequency of the first processing unit 160a.

In this case, the operating clock frequency of the first path unit P1 may be multiples of the operating clock frequency of the bank controller Bc. In this case, a clock domain crossing (CDC) operation for synchronizing the clocks between the bank controller Bc and the first path unit P1 is not required separately, and thus, a delay of data transmission may not occur. Accordingly, faster and more efficient data exchange can be possible.

In the embodiment shown in FIG. 23, an operating clock frequency of the first path unit P1 may be 1.5 GHz, as an example. This may be twice the frequency of 750 MHz of the bank controller Bc. However, the embodiment is not limited thereto, and any operating clock frequency of the first path unit P1 may be possible as long as the first path unit P1 operates at integer multiples of the clock frequency of the bank controller Bc.

The second path unit P2 may be connected to the bank controller Bc. The second path unit P2 may exchange the data of the cell array Ca with the first processing unit 160a not directly but via the global interconnection 6000. In some embodiments, the first processing unit 160a may exchange data with the cell array Ca via the global interconnection 6000 and the second path unit P2. In this case, the cell array Ca may exchange data not only with the first processing unit 160a but also with other processing units.

In some embodiments, the second path unit P2 may be a data exchange path between the cell array Ca and all the processing units when the first memory bank 2110a is implemented logically in the global memory type. The second path unit P2 may include the global controller 2200 of FIG. 22.

The second path unit P2 may form an asynchronous path or Async-Path. The operating clock frequency of the second path unit P2 may be the same as the operating clock frequency of the global interconnection 6000. Likewise, the second path unit P2 may also operate at the same clock frequency as the operating clock frequency of the global interconnection 6000.

In the case of the embodiment as shown in FIG. 23, the operating clock frequency of the second path unit P2 may not be synchronized with the operating clock frequency of the bank controller Bc. In this case, the clock domain crossing (CDC) operation for synchronizing the clocks between the bank controller Bc and the second path unit P2 may be required. If the operating clock frequency of the bank controller Bc and the operating clock frequency of the second path unit P2 are not synchronized with each other, the degree of freedom in the design of the clock domain may be relatively high. Therefore, the difficulty of hardware design is decreased, thereby making it possible to more easily derive the desired hardware operation.

The bank controller Bc may use different address systems in the case of exchanging data via the first path unit P1 and in the case of exchanging data via the second path unit P2. In some embodiments, the bank controller Bc may use a first address system if exchanging data via the first path unit P1 and a second address system if exchanging data via the second path unit P2. In this case, the first address system and the second address system may be different from each other.

A bank controller Bc is not necessarily required for each memory bank. In some embodiments, a bank controller Bc may not be used to schedule, but instead serves to transfer signals, and thus, is not a required component for each memory bank having two ports. Therefore, one bank controller Bc can be operably coupled to control multiple memory banks. The multiple memory banks may operate independently even if they are controlled by the bank controller Bc. However, the embodiment is not limited thereto.

As a matter of course, the bank controller Bc may exist for each memory bank. In this case, the bank controller Bc may control each memory bank individually.

Referring to FIG. 22 and FIG. 23, if the first memory unit 2100a exchanges data via the first path unit P1, the first address system may be used. If the first memory unit 2100a exchanges data via the second path unit P2, the second address system may be used. Similarly, if the second memory unit 2100*b* exchanges data via the first path unit P1, a third address system may be used. If the second memory unit 2100*b* exchanges data via the second path unit P2, the second address system may be used. In this case, the first address system and the third address system may be the same as each other. However, the embodiment is not limited thereto.

The first address system and the third address system may each be used exclusively for the first processing unit 160*a* and the second processing unit 160*b*, respectively. The second address system may be commonly applied to the first processing unit 160*a* and the second processing unit 160*b*.

In FIG. 23, the operating clock frequency of the second path unit P2 may operate at 1 GHz, as an example. This may be a frequency that is not synchronized with the operating clock frequency of 750 MHz of the bank controller Bc. In some embodiments, the operating clock frequency of the second path unit P2 may be freely set without being dependent on the operating clock frequency of the bank controller Bc at all.

A generic global memory has used slow SRAM (e.g., 750 MHz) and a global interconnection (e.g., 1 GHz) faster than that, inevitably resulting in delays due to the CDC operation. On the other hand, the shared memory 2000 in accordance with some embodiments has room to use the first path unit P1 in addition to the second path unit P2, thereby making it possible to avoid delays resulting from the CDC operation.

Furthermore, in the generic global memory, a plurality of processing units use one global interconnection 6000, and thus, when an amount of data transfer occurs at the same time, the decrease in the overall processing speed is likely to occur. On the other hand, the shared memory 2000 in accordance with some embodiments has room to use the first path unit P1 in addition to the second path unit P2, thereby making it possible to achieve the effect of properly distributing the data throughput that could be concentrated on the global controller 2200 as well.

Figure 24:
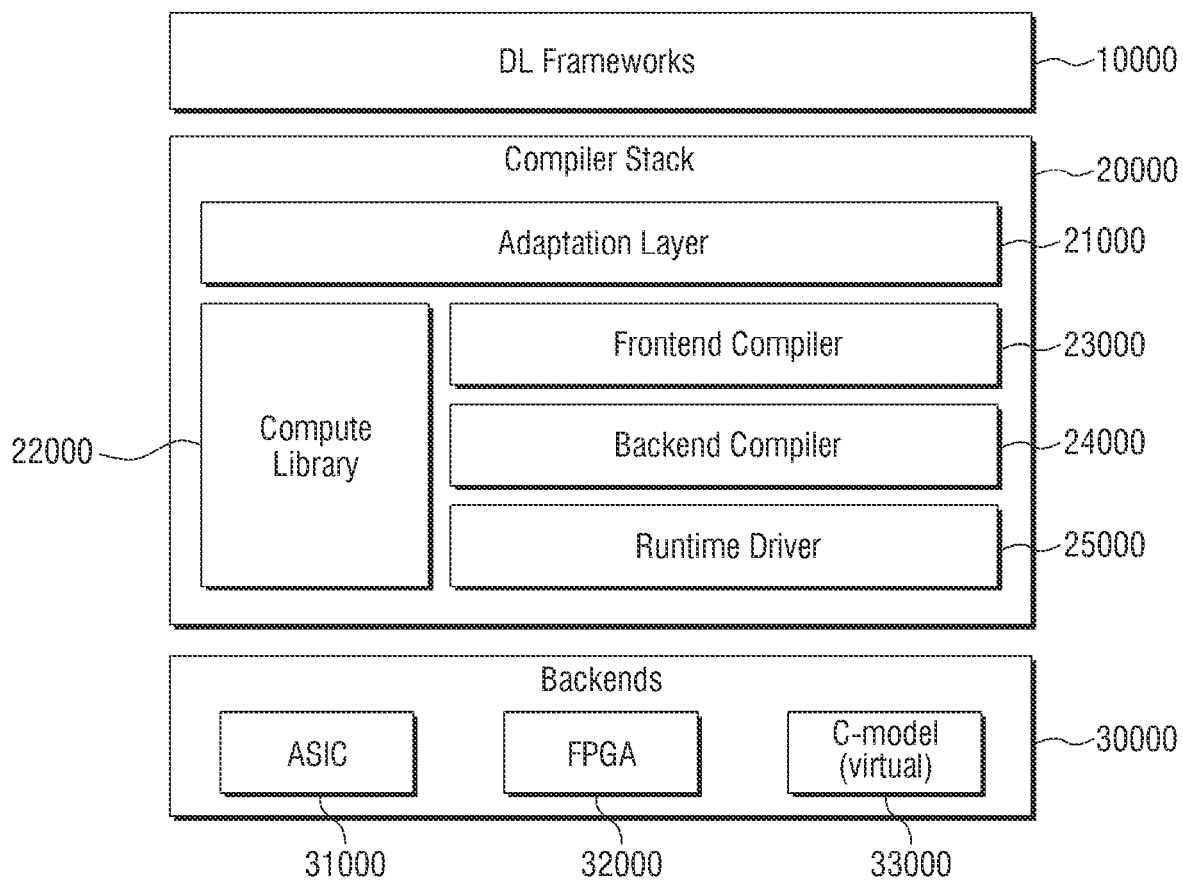
FIG. 24 is a block diagram for illustrating a software hierarchy of a neural processing device in accordance with some embodiments of the disclosure.

FIG. 24 is a block diagram for illustrating a software hierarchy of a neural processing device in accordance with some embodiments.

Referring to FIG. 24, the software hierarchy of the neural processing device in accordance with some embodiments may include a deep learning (DL) framework 10000, a compiler stack 20000, and a back-end module 30000.

The DL framework 10000 may mean a framework for a deep learning model network used by a user. For example, a neural network that has finished training may be generated using a program such as TensorFlow or PyTorch.

The compiler stack 20000 may include an adaptation layer 21000, a compute library 22000, a front-end compiler 23000, a back-end compiler 24000, and a runtime driver 25000.

The adaptation layer 21000 may be a layer in contact with the DL framework 10000. The adaptation layer 21000 may quantize a neural network model of a user generated by the DL framework 10000 and modify graphs. In addition, the adaptation layer 21000 may convert a type of model into a required type.

The front-end compiler 23000 may convert various neural network models and graphs transferred from the adaptation layer 21000 into a constant intermediate representation (IR). The converted IR may be a preset representation that is easy to handle later by the back-end compiler 24000.

The optimization that can be done in advance in the graph level may be performed on such an IR of the front-end compiler 23000. In addition, the front-end compiler 23000 may finally generate the IR through the task of converting it into a layout optimized for hardware.

The back-end compiler 24000 optimizes the IR converted by the front-end compiler 23000 and converts it into a binary file, enabling it to be used by the runtime driver. The back-end compiler 24000 may generate an optimized code by dividing a job at a scale that fits the details of hardware.

The compute library 22000 may store template operations designed in a form suitable for hardware among various operations. The compute library 22000 provides the back-end compiler 24000 with multiple template operations required by hardware, allowing the optimized code to be generated.

The runtime driver 25000 may continuously perform monitoring during driving, thereby making it possible to drive the neural network device in accordance with some embodiments. Specifically, it may be responsible for the execution of an interface of the neural network device.

The back-end module 30000 may include an ASIC (application-specific integrated circuit) 31000, an FPGA (field-programmable gate array) 32000, and a C-model 33000. The ASIC 31000 may be referred to as a hardware chip determined according to a predetermined design method. The FPGA 32000 may be a programmable hardware chip. The C-model 33000 may be referred to as a model implemented by simulating hardware on software.

The back-end module 30000 may perform various tasks and derive results by using the binary code generated through the compiler stack 20000.

Figure 25:
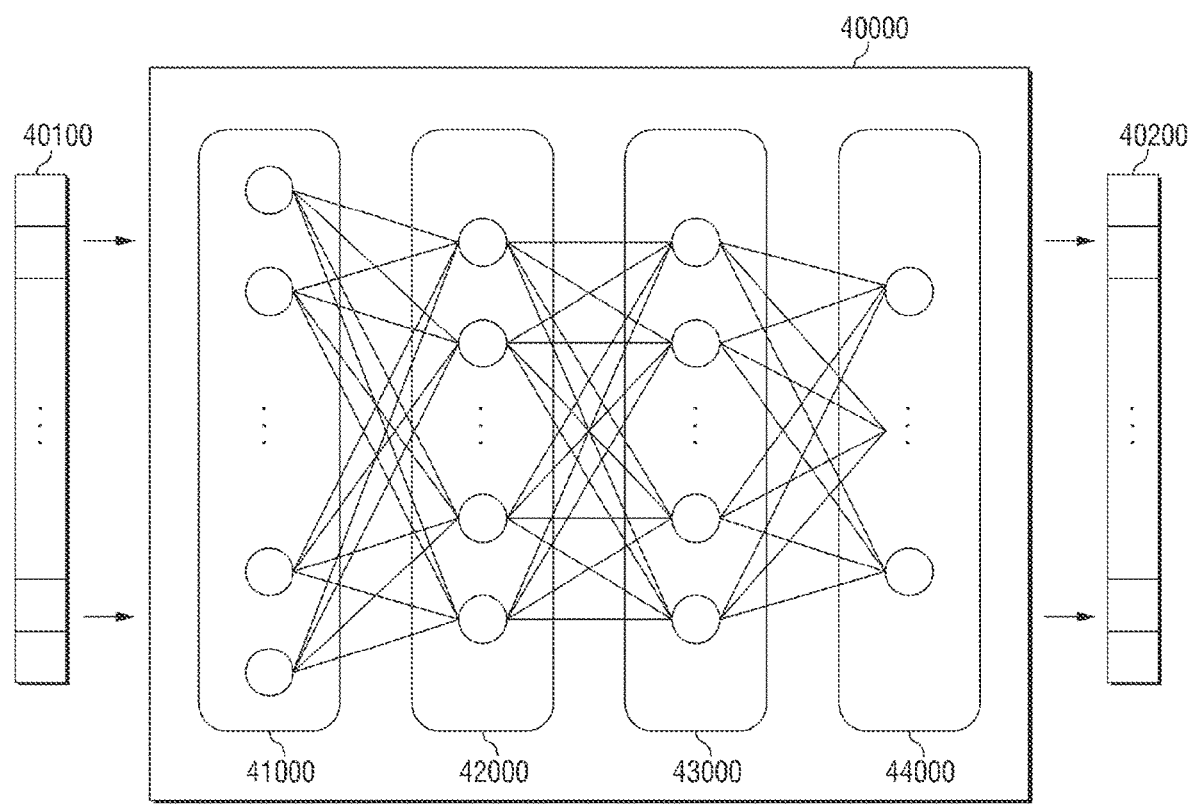
FIG. 25 is a conceptual diagram for illustrating deep learning calculations performed by a neural processing device in accordance with some embodiments of the disclosure.

FIG. 25 is a conceptual diagram for illustrating deep learning calculations performed by a neural processing device in accordance with some embodiments.

Referring to FIG. 25, an artificial neural network model 40000 is one example of a machine learning model and is a statistical learning algorithm implemented based on the structure of a biological neural network or is a structure for executing the algorithm, in machine learning technology and cognitive science.

The artificial neural network model 40000 may represent a machine learning model having an ability to solve problems by learning to reduce the error between an accurate output corresponding to a particular input and an inferred output by repeatedly adjusting the weight of the synapse by nodes. Nodes are artificial neurons that have formed a network by combining synapses, as in a biological neural network. For example, the artificial neural network model 40000 may include any probabilistic model, neural network model, etc., used in artificial intelligence learning methods such as machine learning and deep learning.

A neural processing device in accordance with some embodiments may implement the form of such an artificial neural network model 40000 and perform calculations. For example, the artificial neural network model 40000 may receive an input image and may output information on at least a part of an object included in the input image.

The artificial neural network model 40000 may be implemented by a multilayer perceptron (MLP) including multilayer nodes and connections between them. An artificial neural network model 40000 in accordance with the embodiment may be implemented using one of various artificial neural network model structures including the MLP. As shown in FIG. 24, the artificial neural network model 40000 includes an input layer 41000 that receives input signals or data 40100 from the outside, an output layer 44000 that outputs output signals or data 40200 corresponding to the input data, and n (where n is a positive integer) hidden layers 42000 to 43000 that are located between the input layer 41000 and the output layer 44000 and that receive a signal from the input layer 41000, extract characteristics, and forward them to the output layer 44000. Here, the output layer 44000 receives signals from the hidden layers 42000 to 43000 and outputs them to the outside.

The learning methods of the artificial neural network model 40000 include a supervised learning method for training to be optimized to solve a problem by the input of supervisory signals (correct answers), and an unsupervised learning method that does not require supervisory signals.

The neural processing device may directly generate training data, through simulations, for training the artificial neural network model 40000. In this way, by matching a plurality of input variables and a plurality of output variables corresponding thereto with the input layer 41000 and the output layer 44000 of the artificial neural network model 40000, respectively, and adjusting the synaptic values between the nodes included in the input layer 41000, the hidden layers 42000 to 43000, and the output layer 44000, training may be made to enable a correct output corresponding to a particular input to be extracted. Through such a training phase, it is possible to identify the characteristics hidden in the input variables of the artificial neural network model 40000, and to adjust synaptic values (or weights) between the nodes of the artificial neural network model 40000 so that an error between an output variable calculated based on an input variable and a target output is reduced.

Figure 26:
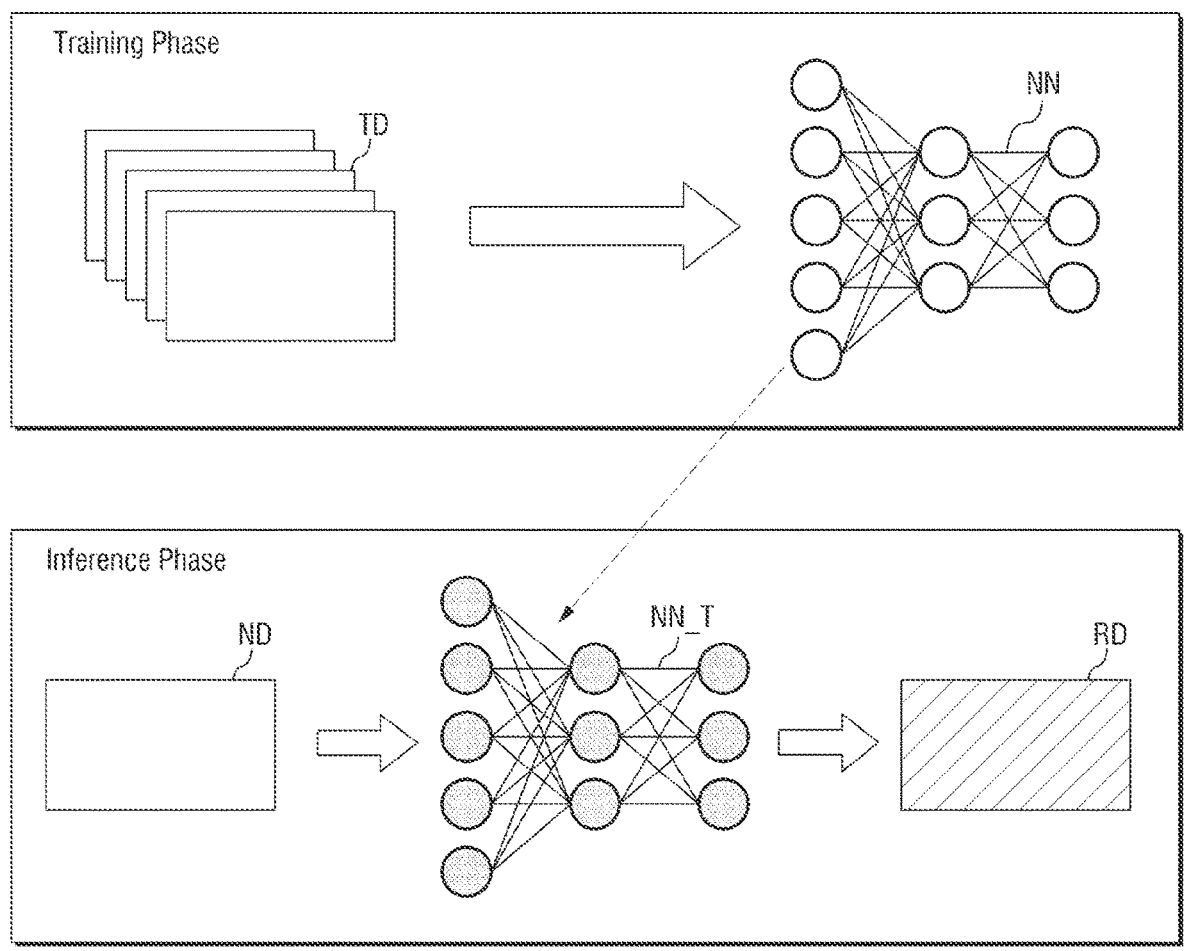
FIG. 26 is a conceptual diagram for illustrating training and inference operations of a neural network of a neural processing device in accordance with some embodiments of the disclosure.

FIG. 26 is a conceptual diagram for illustrating training and inference operations of a neural network of a neural processing device in accordance with some embodiments.

Referring to FIG. 26, the training phase may be subjected to a process in which a large number of pieces of training data TD are passed forward to the artificial neural network model NN and are passed backward again. Through this, the weights and biases of each node of the artificial neural network model NN are tuned, and training may be performed so that more and more accurate results can be derived. Through the training phase, the artificial neural network model NN may be converted into a trained neural network model NN_T.

In the inference phase, new data ND may be inputted into the trained neural network model NN_T again. The trained neural network model NN_T may derive result data RD through the weights and biases that have already been used in the training, with the new data ND as input. For such result data RD, what training data TD were used in training and how many pieces of training data TD were used in the training phase may be important.

Hereinafter, a neural processing device in accordance with some embodiments of the disclosure will be described with reference to FIGS. 27 and 28. Any description overlapping with the embodiments described above will be omitted or simplified.

Figure 27:
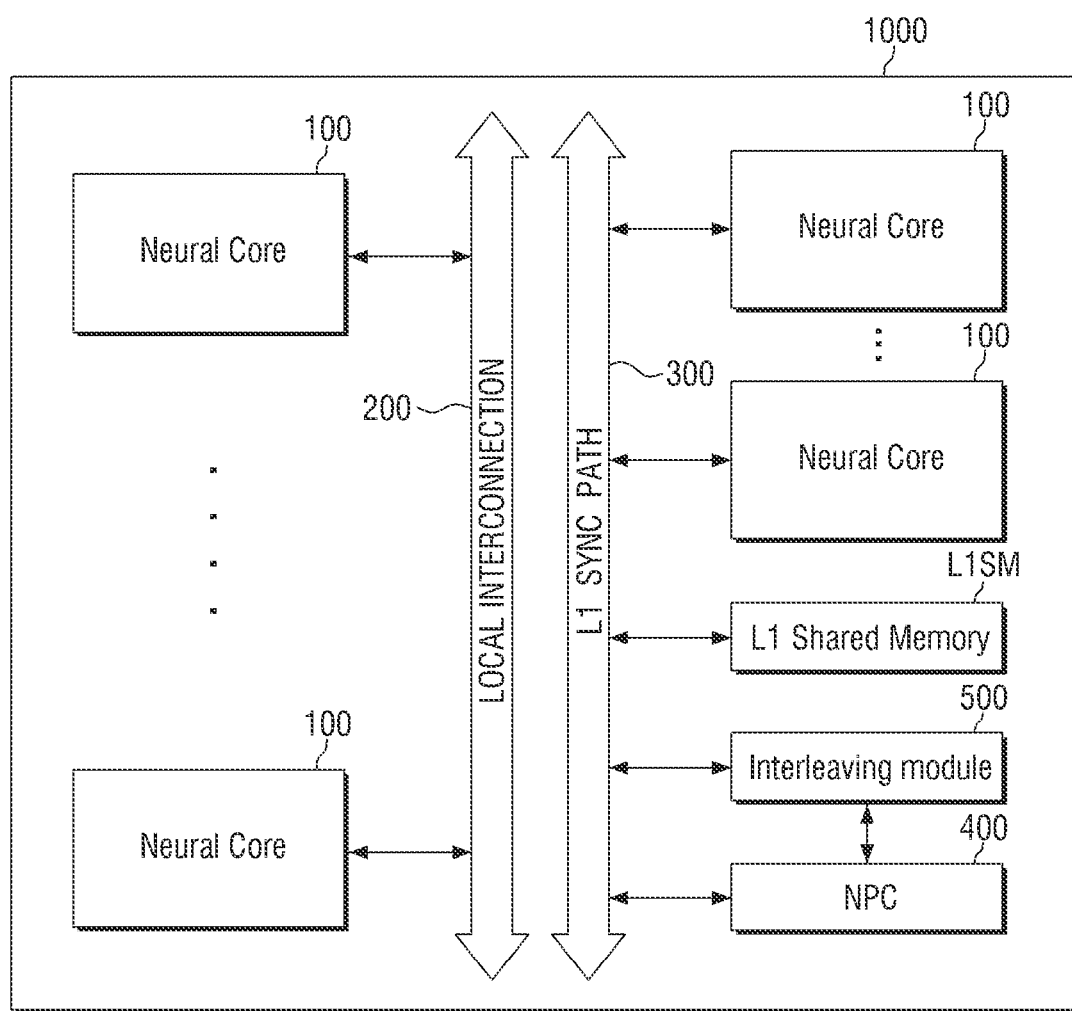
FIG. 27 is a block diagram for illustrating a neural processor of a neural processing device in accordance with some embodiments of the disclosure.
Figure 28:
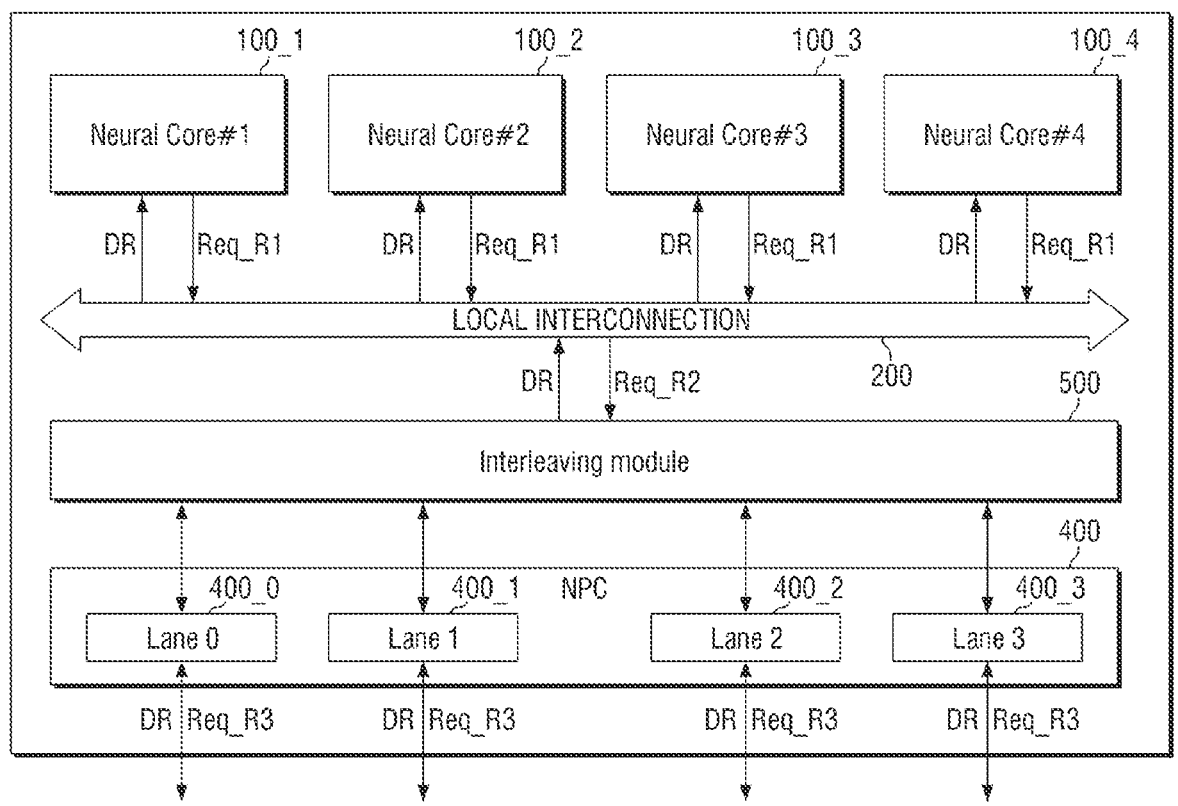
FIG. 28 is a block diagram for illustrating an operation of the neural processor cache and the interleaving module of FIG. 27.

FIG. 27 is a block diagram for illustrating a neural processor of a neural processing device in accordance with some embodiments of the disclosure, and FIG. 28 is a block diagram for illustrating an operation of the neural processor cache and the interleaving module of FIG. 27.

Referring to FIGS. 27 and 28, the neural processor 1000 of the neural processing device 1 in accordance with some embodiments of the disclosure may further include an interleaving module 500.

The interleaving module 500 may receive second read requests Req_R2 of the neural cores 100 and transfer second read requests Req_R2 in sequence to other lanes of the neural processor cache 400. In some embodiments, the second read requests Req_R2 coming from the plurality of neural cores 100 may be distributed to lanes 400_0 to 400_3 of the plurality of independent neural processor caches 400. In this case, the interleaving module 500 may be referred to as an interleaving circuit, but for the sake of convenience, the terms are unified as an interleaving module. In addition, the interleaving module 500 may be implemented as a circuit or circuitry.

Specifically, the neural processor cache 400 may include a first lane 400_0, a second lane 400_1, a third lane 400_2, and a fourth lane 400_3. In this case, the first lane 400_0, the second lane 400_1, the third lane 400_2, and the fourth lane 400_3 may be referred to respectively as a first lane circuit, a second lane circuit, a third lane circuit, and a fourth lane circuit. However, for the sake of convenience, the terms are respectively unified as a first lane, a second lane, a third lane, and a fourth lane. In addition, each of the first lane 400_0, the second lane 400_1, the third lane 400_2, and the fourth lane 400_3 may be implemented as a circuit or circuitry. Although FIG. 28 shows four lanes, the embodiment is not limited thereto. In some embodiments, the number of lanes included in the neural processor cache 400 may vary as desired.

Further, the number of lanes 400_0 to 400_3 need not be the same as the number of neural cores. This is because being the same is not necessarily being optimized depending on the distribution of data. Therefore, the number of lanes 400_0 to 400_3 may differ from the number of neural cores.

The first lane 400_0, the second lane 400_1, the third lane 400_2, and the fourth lane 400_3 may each independently serve as the neural processor cache 400 of FIG. 5. Accordingly, when the first to fourth neural cores 100_1 to 100_4 issue the first read requests Req_R1 that are synchronized well with each other, the efficiency of data transmission can be maximized. Also, even when the first to fourth neural cores 100_1 to 100_4 are not synchronized well with each other, the efficiency of data transmission may not be lower than when the interleaving module 500 is not present.

Hereinafter, a method for transmitting data of a neural processing device in accordance with some embodiments of the disclosure will be described with reference to FIGS. 7, 14, 15, and 29 to 30. Any description overlapping with the embodiments described above will be omitted or simplified.

Figure 29:
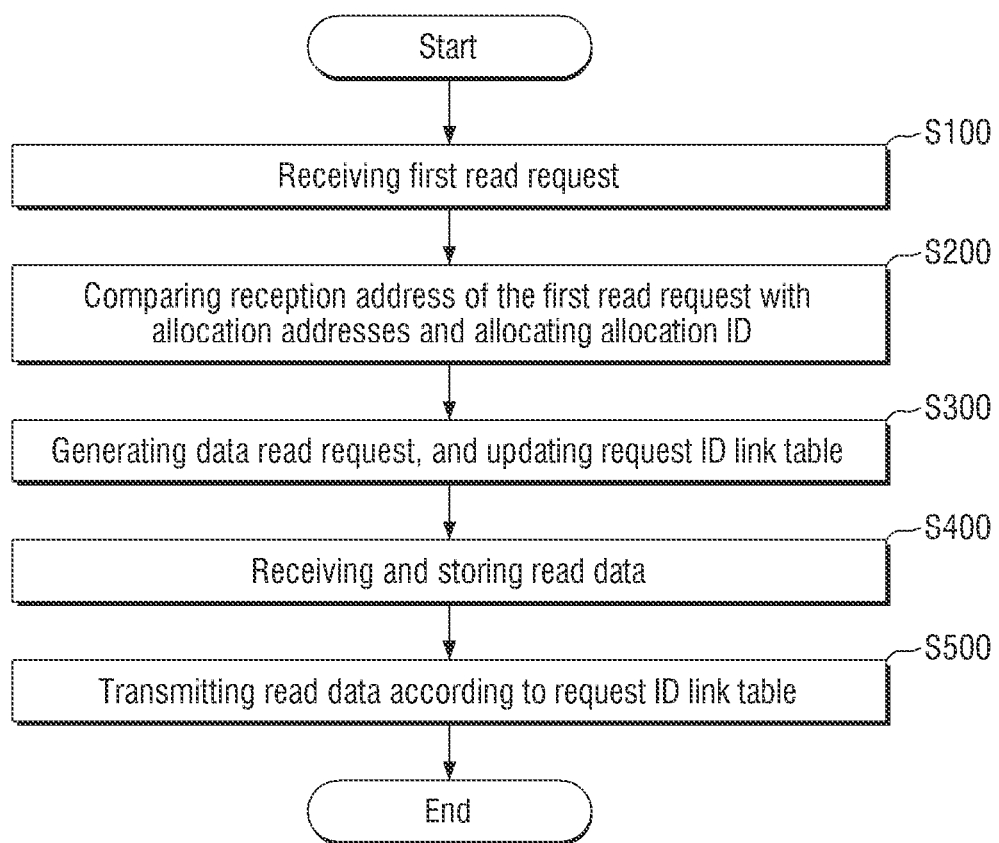
FIG. 29 is a flowchart for illustrating a method for transmitting data of a neural processing device in accordance with some embodiments of the disclosure.
Figure 30:
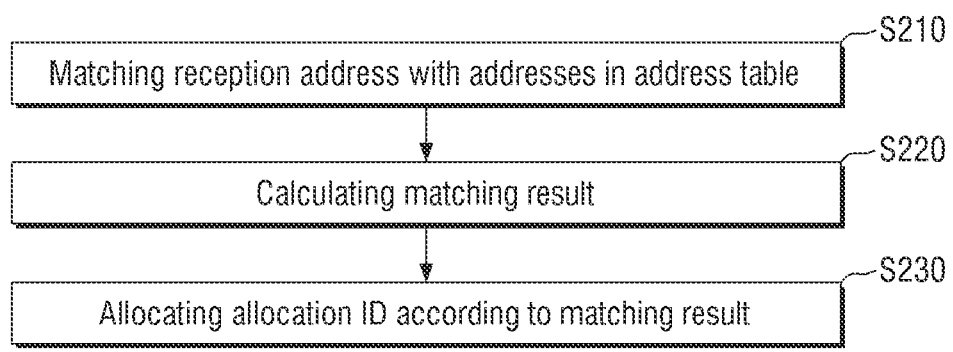
FIG. 30 is a flowchart for illustrating allocating the memory address ID of FIG. 29 in detail.

FIG. 29 is a flowchart for illustrating a method for transmitting data of a neural processing device in accordance with some embodiments of the disclosure, and FIG. 30 is a flowchart for illustrating allocating the memory address ID of FIG. 29 in detail.

Referring to FIG. 29, a first read request is received at S100.

Specifically, referring to FIG. 7, the first read request Req_R1 may include a memory address. The memory address may be referred to as an address of data requested by the first read request Req_R1. In this case, the first read requests Req_R1 may all include the same memory address. In some embodiments, the read requests having the same memory address out of multiple read requests issued by the first to fourth neural cores 100_1 to 100_4 may be defined as the first read request Req_R1.

The local interconnection 200 may receive the first read request Req_R1 and generate a second read request Req_R2. The second read request Req_R2 may be substantially the same as the first read request Req_R1. Alternatively, the second read request Req_R2 may be a request obtained by adding some priority information to the first read request Req_R1. The local interconnection 200 may transmit the second read request Req_R2 to the neural processor cache 400. In some embodiments, the reception of the second read request Req_R2 may substantially be regarded as the reception of the first read request Req_R1.

Referring again to FIG. 29, the memory address of the first read request is compared with the memory addresses in the address table 414 and a memory address ID is allocated at S200.

In detail, referring to FIG. 30, the memory address of the first read request and addresses in the address table are matched at S210.

Specifically, referring to FIG. 15, the comparator 412 may receive the memory address Addr1. The comparator 412 may receive memory addresses Addr2 stored in the address table 414 at present. The comparator 412 may compare the memory address Addr1 and the memory addresses Addr2 and determine whether there is an memory address Addr2 same as the memory address Addr1.

Referring again to FIG. 30, a matching result is calculated at S220, and the memory address ID is allocated according to the matching result at S230.

Specifically, referring to FIG. 15, the address table 414 may receive the memory address ID AL_ID, allocate the memory address ID AL_ID to the memory address Addr1 for which the matching is completed from the comparator 412, and record the memory address ID AL_ID.

Referring again to FIG. 29, a data read request is generated and the request ID link table is updated at S300.

Specifically, referring to FIG. 14, the address decoder 410 may generate a data read request DR_Req corresponding to the second read request Req_R2. The data read request DR_Req may be transmitted to the data requester 420 as a representative of the read requests having the same memory address as the second read request Req_R2. In some embodiments, as the same read requests of multiple times can be reduced to one read request, the efficiency of data transmission can be greatly improved.

In the case of a valid second read request Req_R2, the address decoder 410 may compare a memory address included in the second read request Req_R2 with memory addresses in the address table 414. In some embodiments, each of the memory addresses in the address table 414 may be allocated a memory address ID. The address decoder 410 may record the memory address ID and the memory address in an address table and generate the memory address ID and the memory address as a list update signal List_upt. The address decoder 410 may transmit the list update signal List_upt to the request ID manager 440.

Referring again to FIG. 29, read data is received and stored at S400.

Specifically, referring to FIG. 14, the data buffer 430 may receive and store the read data DR. The data buffer 430 may include SRAM, but the embodiment is not limited thereto. The data buffer 430 may temporarily store the read data DR and then transmit the read data DR to the data completer 450. In some embodiments, the data completer 450 may transfer a signal requesting transmission of the read data DR to the data buffer 430. However, the embodiment is not limited thereto.

Referring again to FIG. 29, the read data is transmitted according to the request ID link table at S500.

Specifically, referring to FIG. 14, the data completer 450 may receive the request ID. The data completer 450 may receive the read data DR and transmit the read data DR to the neural core that issued the read request according to the request ID.

Figure 31:
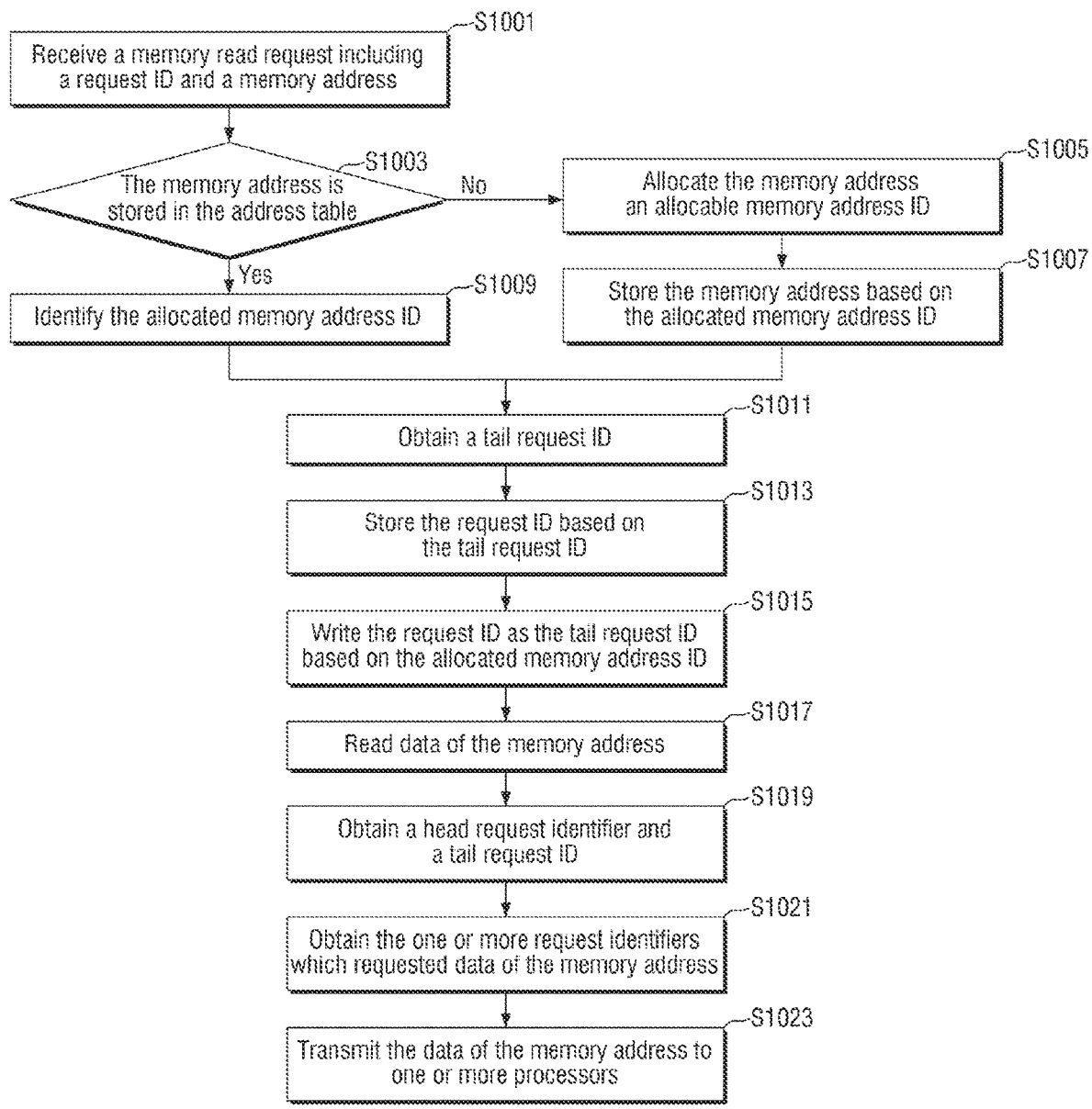
FIG. 31 is a flowchart illustrating an operation method of the NPC 400 in accordance with some embodiments of the disclosure.

FIG. 31 is a flowchart illustrating an operation method of the NPC 400 in accordance with some embodiments of the disclosure.

The NPC 400 may receive a memory read request including a request identifier and a memory address from at least one of the plurality of neural cores 100 at S1001.

The NPC 400 may identify an allocated memory address identifier for the memory address of the memory read request by checking whether the memory address of the memory read request is stored in the address table 414 at S1003.

When the memory address of the memory read request is not stored in the address table 414, the NPC 400 may allocate the memory address of the memory read request an allocable memory address identifier among the plurality of memory address identifiers at S1005.

After the NPC 400 allocates the memory address a memory address identifier, the NPC 400 may store the memory address of the memory read request to a memory unit of the address table 414 based on the allocated memory address identifier at S1007. In some embodiments, the NPC 400 may store the memory address to a memory unit corresponding to the allocated memory address identifier. In some embodiments, the allocated memory address identifier may point to the location of memory unit of the address table 414. For example, the allocated memory address identifier A may point to A-th memory unit of the linked-list head/tail table 441.

When the memory address of the memory read request is stored in the address table 414, the NPC 400 may identify a location of a memory unit storing the memory address in the address table 414 as the allocated memory address identifier at S1009.

The NPC 400 may read a memory unit of the linked-list head/tail table 441 based on the allocated memory address identifier to obtain a tail request identifier at S1011. In some embodiments, the NPC 400 may read a memory unit corresponding to the allocated memory address identifier to obtain a tail request identifier. In some embodiments, the NPC 400 may read a memory unit pointed to by the allocated memory address identifier to obtain a tail request identifier.

The NPC 400 may store the request identifier of the memory read request to the memory unit of the request ID link table 442 based on the tail request identifier at S1013. In some embodiments, the NPC 400 may store the request identifier to the memory unit corresponding to the tail request identifier. In some embodiments, the NPC 400 may store the request identifier to the memory unit pointed to by the tail request identifier. For example, the tail request identifier T may point to T-th memory unit of the request ID link table 442.

The NPC 400 may write the request identifier of the memory read request as the tail request identifier to a memory unit of the linked-list head/tail table 441 based on the allocated memory address identifier at S1015. In some embodiments, the NPC 400 may write the request identifier to a memory unit corresponding to the allocated memory address identifier. In some embodiments, the NPC 400 may write the request identifier to a memory unit pointed to by the allocated memory address identifier.

The NPC 400 may access the L1 shared memory L1SM to read data of the memory address at S1017.

The NPC 400 may obtain one or more request identifiers which requested data of the memory address based on the allocated memory address identifier from the request ID link table 442. The NPC 400 may access a memory unit of the linked-list head/tail table 441 based on the allocated memory address identifier to obtain a head request identifier and a tail request identifier at S1019. In some embodiments, the NPC 400 may access a memory unit corresponding to the allocated memory address identifier. In some embodiments, the NPC 400 may access a memory unit pointed to by the allocated memory address identifier. At S1021, the NPC 400 may read a memory unit of the request ID link table 442 based on the head request identifier to obtain a next request identifier and reading a memory unit of the request ID link table 442 based on the next request identifier unless the next request identifier is the tail request identifier to obtain the one or more request identifiers which requested data of the memory address. In some embodiments, the NPC 400 may read a memory unit corresponding to the head request identifier. In some embodiments, the NPC 400 may read a memory unit pointed to by the head request identifier. For example, the head request identifier H may point to H-th memory unit of the request ID link table 442.

The NPC 400 may transmit the data of the memory address to one or more processors which requested data of the memory address based on the one or more request identifiers at S1023.

According to some aspects of the disclosure, a neural processing device includes at least one neural processor including a first neural processor, a shared memory shared by the at least one neural processor, and a global interconnection configured to transmit data between the at least one neural processor and the shared memory, wherein the first neural processor includes a first neural core configured to generate a first read request and have a first request ID, a local interconnection configured to receive the first read request and transmit a second read request for the first read request, and a neural processor cache configured to receive the second read request, receive read data for the second read request, and transfer the read data to the first neural core.

According to some aspects, the neural processor cache transfers a third read request for the second read request to the global interconnection, and receives the read data from the global interconnection.

According to some aspects, the neural processor cache includes an address decoder configured to allocate an allocation ID to the second read request, write the allocation ID of the second read request and the first request ID to a request ID link table, and generate a data read request according to the request ID link table, a data requester configured to generate and transfer a third read request for the data read request to the global interconnection, and receive the read data for the third read request, a data buffer configured to store the read data, and a data completer configured to transfer the read data to the first neural core.

According to some aspects, the neural processor cache further includes a request ID manager configured to store the request ID link table and transfer the first request ID to the data completer.

According to some aspects, the data completer transfers a return signal of the allocation ID to the address decoder when a transfer of the read data is completed.

According to some aspects, the address decoder unbinds the allocation ID according to the return signal and stores the allocation ID in an allocation free list.

According to some aspects, the allocation free list is of a first in, first out (FIFO) structure.

According to some aspects, the address decoder matches a reception address of the second read request with addresses in an address table, and allocates the allocation ID to the reception address if the reception address is identical to the one of the addresses in the address table.

According to some aspects, the request ID manager includes a linked-list head/tail table configured to store a head request ID and a tail request ID corresponding to each address, and the request ID link table coupled with the linked-list head/tail table and configured to designate a next request ID.

According to some aspects, the address decoder generates a list update signal that updates the linked-list head/tail table and the request ID link table.

According to some aspects, the data completer identifies a request ID according to the allocation ID and transfers the read data.

According to some aspects, the first neural processor further includes a second neural core configured to generate a first read request and have a second request ID that is different from the first request ID.

According to some aspects, the neural processor cache receives the first read request of the first request ID and the first read request of the second request ID, and requests the read data at once.

According to some aspects, the first read request of the first request ID and the first read request of the second request ID include same address with each other.

According to some aspects, the neural processor cache includes two or more lanes, each of which configured to receive the second read request independently and respectively receive the read data corresponding to the second read request.

According to some aspects, the first neural processor further includes an interleaving module configured to distribute the second read request to the two or more lanes.

According to some aspects, a number of lanes is different from a number of neural cores.

According to some aspects of the disclosure, a method for processing data of a neural processing device, includes receiving a first read request, comparing a reception address of the first read request with allocation addresses, and allocating an allocation ID to the reception address, generating a data read request according to the first read request, updating the allocation ID to a request ID link table, receiving read data corresponding to the data read request, and transmitting the read data to a neural core according to the request ID link table.

According to some aspects, comparing the reception address with the allocation addresses includes matching the reception address with addresses in an address table and calculating a matching result, and allocating the allocation ID to the reception address according to the matching result.

According to some aspects, the allocation ID is unbound by a return signal after being allocated.

In the present disclosure, the neural Core SoC 10, the neural processor 1000, the non-volatile memory controller 4000, the volatile memory controller 5000, the neural core 100, and the processing unit 160 may be referred to as a processor.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. A processing device comprising processing circuitry comprising:
a plurality of processors;
a first memory shared by the plurality of processors; and
a cache comprising a second memory comprising a plurality of memory units, each of the plurality of memory units in the second memory being associated with a respective one of a plurality of request identifiers,
wherein the cache is configured to cause:
receiving, from at least one of the plurality of processors, a memory read request including a request identifier and a memory address,
identifying an allocated memory address identifier for the memory address,
accessing the first memory to read data of the memory address,
obtaining one or more request identifiers which requested data of the memory address from the second memory based on the allocated memory address identifier, and
transmitting the data of the memory address to one or more processors which requested data of the memory address based on the one or more request identifiers,
wherein the cache further comprises:
a third memory including a plurality of memory units, each of the plurality of memory units in the third memory being associated with a respective one of a plurality of memory address identifiers,
wherein the cache is further configured to cause:
reading a memory unit of the third memory based on the allocated memory address identifier to obtain a tail request identifier,
storing the request identifier of the memory read request to a memory unit of the second memory based on the tail request identifier, and
writing the request identifier of the memory read request as the tail request identifier to a memory unit of the third memory based on the allocated memory address identifier.

2. The processing device of claim 1, wherein obtaining the one or more request identifiers comprises:
accessing a memory unit of the third memory based on the allocated memory address identifier to obtain a head request identifier and a tail request identifier,
accessing the second memory based on the head request identifier and the tail request identifier to obtain the one or more request identifiers, and wherein accessing the second memory based on the head request identifier and the tail request identifier comprises:
reading a memory unit of the second memory based on the head request identifier to obtain a next request identifier and reading a memory unit of the second memory based on the next request identifier unless the next request identifier is the tail request identifier to obtain the one or more request identifiers which requested data of the memory address.

3. The processing device of claim 1, wherein the cache further comprises:
a fourth memory including a plurality of memory units, each of the plurality of memory units in the fourth memory being associated with a respective one of a plurality of memory address identifiers.

4. The processing device of claim 3, wherein the cache is further configured to cause:
checking whether the memory address is stored in the fourth memory.

5. The processing device of claim 4, wherein identifying the allocated memory address identifier for the memory address comprises:
when the memory address is not stored in the fourth memory, allocating the memory address an allocable memory address identifier among the plurality of memory address identifiers, and storing the memory address to a memory unit of the fourth memory based on the allocated memory address identifier.

6. The processing device of claim 4, wherein identifying the allocated memory address identifier for the memory address comprises:
when the memory address is stored in the fourth memory, identifying a location of a memory unit storing the memory address in the fourth memory as the allocated memory address identifier.

7. The processing device of claim 1, wherein the memory address is an address indicating a memory unit in the first memory, an address representing a memory array including a plurality of memory units in the first memory, or an address representing a memory pattern including a plurality of memory units in the first memory.

8. A method of operating a processing device comprising a plurality of processors, a shared memory shared by the plurality of processors, and a cache, wherein the cache comprises a first table comprising a plurality of elements, each of the plurality of elements in the first table being associated with a respective one of a plurality of request identifiers, the method comprising:
receiving, by the cache from at least one of the plurality of processors, a memory read request including a request identifier and a memory address;
identifying, by the cache, an allocated memory address identifier for the memory address,
accessing, by the cache, the shared memory to read data of the memory address;
obtaining, by the cache from the first table, one or more request identifiers which requested data of the memory address based on the allocated memory address identifier; and
transmitting, by the cache, the data of the memory address to one or more processors which requested data of the memory address based on the one or more request identifiers,
wherein the cache further comprises:
a second table including a plurality of elements, each of the plurality of elements in the second table being associated with a respective one of a plurality of memory address identifiers,
wherein the method is further comprising:
reading, by the cache, an element of the second table based on the allocated memory address identifier to obtain a tail request identifier;
storing, by the cache, the request identifier of the memory read request to an element of the first table based on the tail request identifier; and
writing, by the cache, the request identifier of the memory read request as the tail request identifier to an element of the second table based on the allocated memory address identifier.

9. The method of claim 8, wherein obtaining the one or more request identifiers comprises:
accessing an element of the second table based on the allocated memory address identifier to obtain a head request identifier and a tail request identifier, and accessing the first table based on the head request identifier and the tail request identifier to obtain the one or more request identifiers, and wherein accessing the first table based on the head request identifier and the tail request identifier comprises:

reading an element of the first table based on the head request identifier to obtain a next request identifier and reading an element of the first table based on the next request identifier unless the next request identifier is the tail request identifier to obtain the one or more request identifiers which requested data of the memory address.

10. The method of claim 8, wherein the cache further comprises:

a third table including a plurality of elements, each of the plurality of elements in the third table being associated with a respective one of a plurality of memory address identifiers.

11. The method of claim 10, further comprising:

checking, by the cache, whether the memory address is stored in the third table.

12. The method of claim 11, wherein identifying the allocated memory address identifier for the memory address comprises:

when the memory address is not stored in the third table, allocating the memory address an allocable memory address identifier among the plurality of memory address identifiers, and storing the memory address to an element of the third table based on the allocated memory address identifier.

13. The method of claim 11, wherein identifying the allocated memory address identifier for the memory address comprises:

when the memory address is stored in the third table, identifying a location of an element storing the memory address in the third table as the allocated memory address identifier.

14. The method of claim 8, wherein the memory address is an address indicating a memory unit in the shared memory, an address representing a memory array including a plurality of memory units in the shared memory, or an address representing a memory pattern including a plurality of memory units in the shared memory.

* * * * *